(12) United States Patent
Chen

(10) Patent No.: US 10,795,565 B2
(45) Date of Patent: Oct. 6, 2020

(54) METHOD OF ACCELERATING SCROLLING INPUT AND MOUSE

(71) Applicant: Darfon Electronics Corp., Taoyuan (TW)

(72) Inventor: Xi-Sheng Chen, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 16/031,528

(22) Filed: Jul. 10, 2018

(65) Prior Publication Data

US 2019/0018561 A1 Jan. 17, 2019

(30) Foreign Application Priority Data

Jul. 11, 2017 (TW) .............................. 106123129 A

(51) Int. Cl.
| | |
|---|---|
| *G06F 3/0485* | (2013.01) |
| *G06F 3/0487* | (2013.01) |
| *G06F 3/0362* | (2013.01) |
| *G06F 3/038* | (2013.01) |
| *G06F 3/0354* | (2013.01) |

(52) U.S. Cl.
CPC ............ *G06F 3/0485* (2013.01); *G06F 3/038* (2013.01); *G06F 3/0362* (2013.01); *G06F 3/03543* (2013.01); *G06F 3/0487* (2013.01)

(58) Field of Classification Search
CPC ...... G06F 3/0485; G06F 3/3543; G06F 3/038; G06F 3/0362; G06F 3/0487
See application file for complete search history.

(56) References Cited

U.S. PATENT DOCUMENTS

| | | | |
|---|---|---|---|
| 5,495,566 A | 2/1996 | Kwatinetz | |
| 6,738,045 B2 | 5/2004 | Hinckley et al. | |
| 7,173,637 B1 | 2/2007 | Hinckley et al. | |
| 8,446,366 B2 | 5/2013 | Blandin et al. | |
| 9,880,801 B2* | 1/2018 | Bull ...................... | G06F 3/0414 |
| 2003/0076301 A1* | 4/2003 | Tsuk ..................... | G06F 1/1626 |
| | | | 345/159 |
| 2007/0200826 A1 | 8/2007 | Zeng et al. | |
| 2007/0279382 A1* | 12/2007 | Large .................. | G06F 3/03543 |
| | | | 345/163 |

(Continued)

FOREIGN PATENT DOCUMENTS

| | | |
|---|---|---|
| CN | 101382848 A | 3/2009 |
| CN | 201673460 U | 12/2010 |

(Continued)

OTHER PUBLICATIONS

Office Action in related matter TW 10721221420 dated Dec. 26, 2018.

(Continued)

*Primary Examiner* — Matthew Ell
(74) *Attorney, Agent, or Firm* — Patterson + Sheridan, LLP

(57) ABSTRACT

The present disclosure discloses a method of accelerating scrolling input and a mouse using the method. The mouse detects a scrolling operation through a scrolling input receiving device thereof and determines whether a trigger condition is satisfied. If the trigger condition is satisfied, the mouse operates in an accelerating output state and outputs a scrolling count value in accordance with the corresponding predetermined accelerating output relation.

21 Claims, 17 Drawing Sheets

(56) References Cited

U.S. PATENT DOCUMENTS

2012/0026090 A1 2/2012 Zielke et al.
2013/0311939 A1 11/2013 Hsu et al.
2016/0180820 A1 6/2016 Pascucci et al.

FOREIGN PATENT DOCUMENTS

| CN | 103425297 A | 12/2013 |
| JP | 3162701 U | 9/2010 |
| TW | I471759 B | 2/2015 |

OTHER PUBLICATIONS

Office Action in related application 201710581581.6 dated Dec. 27, 2019.

\* cited by examiner

METHOD OF ACCELERATING SCROLLING INPUT AND MOUSE

FIELD

The present disclosure relates to a mouse and a method of accelerating scrolling input applicable to mouse, and more particularly to a method of accelerating scrolling input and a mouse using the same that operates in a plurality of accelerating output states.

BACKGROUND

The scroll wheel of a computer mouse enables the user to scroll a document or webpage to desired content section by scrolling the scroll wheel. However, when the document is too large or the webpage is too long, the user has to scroll the scroll wheel constantly in order to view desired section, which is a waste of time and likely to cause damage to the finger. To solve the aforementioned problem, some solutions that propose to accelerate scrolling operation have been provided, in which the rotation amount of the scroll wheel is outputted in multiplied proportion as the scrolling amount of the document of webpage. Detailed mechanism can be, for example, the acceleration mode is started when a trigger button disposed on the mouse is triggered, or the acceleration state of the scroll wheel itself triggers the acceleration mode. Either way, the scrolling distance shown in the operating system corresponds to the actual scrolling amount of the scroll wheel. That is to say, when the webpage is long, the user still needs scrolling the scroll wheel constantly so as to view desired section.

SUMMARY

Accordingly, the present disclosure provides a method of accelerating scrolling operation, in which the mouse enters an accelerating output state and outputs a scrolling count value in accordance with a predetermined scrolling output relation while operating in the accelerating output state, without the user having to scroll the scroll wheel on the mouse constantly.

According to one embodiment of the present disclosure, the method of accelerating scrolling operation is applicable to a mouse including a scrolling input receiving device. The mouse has an initial output state, a first accelerating output state, and a second accelerating output state, in which the first accelerating output state corresponds to a first predetermined scrolling output relation between time input and aggregated count output, and the second accelerating output state corresponds to a second predetermined scrolling output relation between time input and aggregated count output. The method of accelerating scrolling input includes: (a) the mouse detecting a scrolling operation performed on the scrolling input receiving device using the scrolling input receiving device; (b) the mouse generating an aggregated count value using the scrolling input receiving device by aggregating the scrolling count of the scrolling operation during a preset time interval, and (c) when the mouse determines that the aggregated count value is greater than a predetermined value, performing the following steps: (c1) if the mouse operates in the initial output state, the mouse switches to the first accelerating output state and outputs a scrolling count value according to the first predetermined scrolling output relation; (c1) if the mouse operates in the first accelerating output state, the mouse switches to the second accelerating output state and outputs a scrolling count value according to the second predetermined scrolling output relation. In this way, when the user performs a scrolling operation such that the aggregated count value is greater than the predetermined value, the mouse enters the accelerating output state and outputs the scrolling count value according to the corresponding predetermined scrolling output relation without the user having to constantly operate the scrolling input receiving device on the mouse.

Another objective of the present disclosure is to provide a mouse using the above method so as to provide the user with accelerated scrolling input.

According to one embodiment of the present disclosure, the mouse includes a scrolling input receiving device, an output interface, and a microcontroller electrically connected to the scrolling input receiving device and the output interface respectively. The microcontroller has an initial output state, a first accelerating output state, and a second accelerating output state. A first predetermined scrolling output relation between time input and aggregated count output corresponding to the first accelerating output state and a second predetermined scrolling output relation between time input and aggregated count output corresponding to the second accelerating output state are stored in the microcontroller. The microcontroller detects a scrolling operation performed on the scrolling input receiving device using the scrolling input receiving device and generates an aggregated count value using the scrolling input receiving device by aggregating the scrolling count of the scrolling operation during a preset time interval. When the microcontroller determines that the aggregated count value is greater than a predetermined value and the microcontroller operates in the initial output state, the microcontroller switches to the first accelerating output state and outputs a scrolling count value according to the first predetermined scrolling output relation via the output interface. When the microcontroller determines that the aggregated count value is greater than the predetermined value and the microcontroller operates in the first accelerating output state, the microcontroller switches to the second accelerating output state and outputs a scrolling count value according to the second predetermined scrolling output relation via the output interface. In practice, the aggregated count value outputted according to the second predetermined scrolling output relation is greater than that according to the first predetermined scrolling output relation. Similarly, when the user performs a scrolling operation such that the aggregated count value is greater than the predetermined value, the mouse enters the accelerating output state and outputs the scrolling count value according to the corresponding predetermined scrolling output relation without the user having to constantly operate the scrolling input receiving device on the mouse.

Another objective of the present disclosure is to provide a multi-stage accelerating scrolling input method, in which the mouse enters a first accelerating output state. When the mouse satisfies a trigger condition while in the first accelerating output state, the mouse enters the second accelerating output state. The first accelerating output state and the second accelerating output state correspond to different predetermined scrolling output relations respectively.

According to one embodiment of the present disclosure, a method of accelerating input method applicable to a mouse is provided. The mouse includes a scrolling input receiving device and has an initial output state, a first accelerating output state, and a second accelerating output state. When the mouse operates in the initial output state, the mouse outputs a scrolling count value in direct proportion with the scrolling amount received by the scrolling input receiving device. When the mouse operates in the first accelerating output state, the mouse outputs a scrolling count value according to the first predetermined scrolling output relation. When the mouse operates in the second accelerating output state, the mouse outputs a scrolling count value according to the second predetermined scrolling output relation, in which the scrolling count value in accordance with second predetermined scrolling output relation is greater than that in accordance with the first predetermined scrolling output relation. The method of accelerating rolling output including the following steps: (a) determining whether a first scrolling operation received by the scrolling input receiving device satisfies a trigger condition; (b) when it is determined that the first scrolling operation does not satisfy the trigger condition, the mouse stays in the initial output state; (c) when the first scrolling operation satisfies the trigger condition, performing the following steps: (c1) when it is determined that the mouse operates in the initial output state before the first scrolling operation is performed, the mouse enters the first accelerating output state and stays therein for a first predetermined time interval; (c2) when it is determined that the mouse detects a second scrolling operation satisfying the trigger condition before the first predetermined time interval ends, the mouse enters the second accelerating output state and stays therein for a second predetermined time interval; (c3) if it is determined that the mouse does not detect the second scrolling operation satisfying the trigger condition before the first predetermined time interval ends, the mouse resumes the initial output state when the first predetermined time interval ends. In this way, after the mouse enters the first accelerating output state, the mouse resumes the initial output state when the first predetermined time interval ends or enters the second accelerating output state of a higher scrolling speed upon another scrolling operation satisfying the trigger condition performed by the user.

Compared with mouse and method of accelerating scrolling input in the prior art, the mouse and method of accelerating scrolling input of the present disclosure enables the user to optionally scroll the scroll wheel at different speeds such that the mouse enters the accelerating output state when certain conditions are satisfied, that is, the mouse serves as an input device for the user to perform accelerating input on the computer. Furthermore, by determining whether a trigger condition is satisfied, the mouse and the method of accelerating scrolling input of the present disclosure decide whether to enter the accelerating output state. For instance, by monitoring the scrolling count value aggregated in a period of time and determining whether the trigger condition, which can be a threshold speed in this case, is satisfied, the method and mouse of the present disclosure decide whether to enter the accelerating output state, which more closely meets the actual needs. Moreover, when the mouse operates in the accelerating output state, the mouse outputs a scrolling count value in accordance with corresponding predetermined scrolling output relation, which can be seen as a virtual scrolling output, thereby obviating the need for constantly operating the mouse, i.e. the mouse receiving the scrolling operation via the scrolling input receiving device, and reducing the stress on user body, e.g. on the wrist joints.

The spirit and advantages of the present disclosure can be further understood with the description below and appended drawings.

DETAILED DESCRIPTION OF THE PREFERRED EMBODIMENTS

Figure 1:
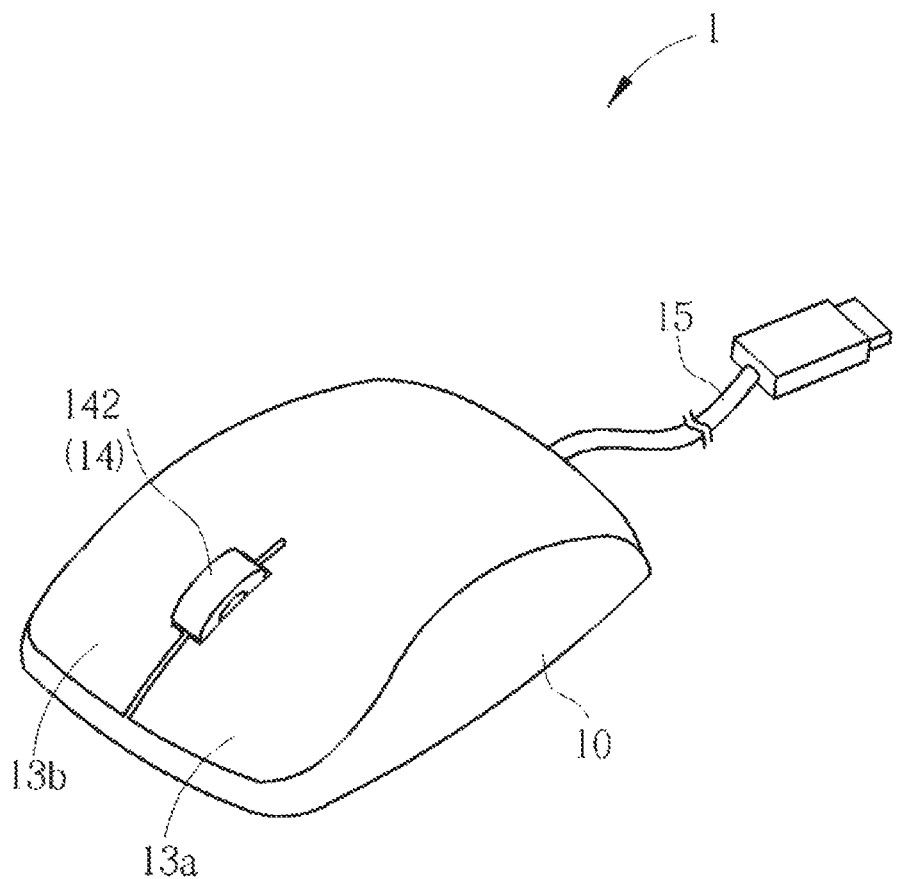
FIG. 1 is a schematic view illustrating a mouse according to one embodiment of the present disclosure.
Figure 2:
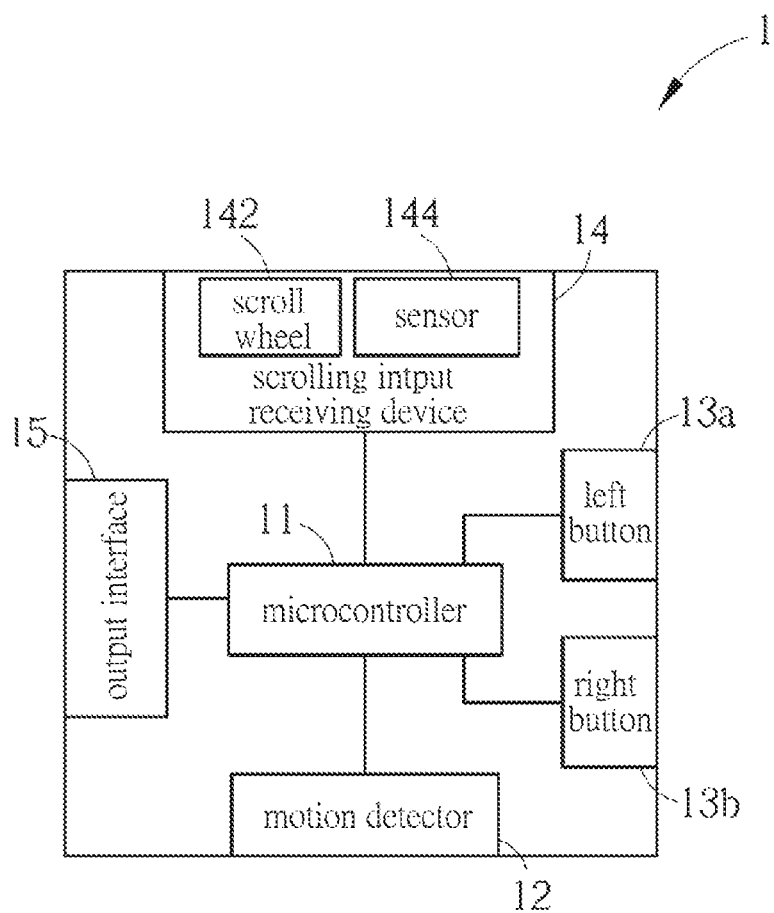
FIG. 2 is a functional block diagram of the mouse of FIG. 1.

Referring to FIGS. 1 and 2, the present disclosure provides a mouse 1 including a casing 10, a microcontroller 11, a motion detector 12, a left button 13a, a right button 13b, a scrolling input receiving device 14, and an output interface 15. The microcontroller 11, the motion detector 12, the left button 13a, the right button 13b, and the scrolling input receiving device 14 are disposed inside the casing 10. In practice, the microcontroller 11 is normally integrated into a circuit board module. The circuit board module includes, for example, a circuit board, and a processing unit, a memory, at least one electrical connection interface and other operational electrical components disposed thereon. The motion detector 12, the left button 13a, the right button 13b, the scrolling input receiving device 14, and the output interface 15 are electrically connected to the microcontroller 11. Furthermore, the pressing portion of the left button 13a and the right button 13*b* are integrated in the casing 10, and the switch of the left button 13*a* and that of the right button 13*b* are located underneath the pressing portion thereof and welded to the circuit board so as to be electrically connected to the microcontroller 11. The motion detector 12 is usually exposed from the bottom surface of the casing 10 so as to detect the relative motion between the casing 10 and the table surface, for example. In practice, the motion detector 12 may detect the motion of the mouse 1 via, but not limited to, optical images or an encoder wheel. Furthermore, the motion detector 12 can also detect the motion by monitoring the scrolling of a trackball, which is normally exposed from the upper surface of the casing 10. The scrolling input receiving device 14 receives the scrolling operation of the user. In the present embodiment, the scrolling input receiving device 14 includes a scroll wheel 142 and a sensor 144 disposed next to the scroll wheel 142. Part of the scroll wheel 142 protrudes from the casing 10 for the user to scroll using, for example, the finger. In practice, the scrolling input receiving device 14 further includes an encoder wheel in actuation connection with the scroll wheel 142 and arranged together with the sensor 144 such that the sensor 144 determines the scrolling distance or rotation angle of the scroll wheel 142 by detecting the scrolling of the encoder wheel. The sensor 144 is usually welded to the circuit board and electrically connected to the microcontroller 11; however, the present disclosure is not limited thereto. For instance, in an actual embodiment, the encoder wheel in actuation connection with the scroll wheel 142 may have 36 gratings such that when the scroll wheel 142 makes a full rotation, the sensors 144 disposed at opposite sides of the scroll wheel 142 make 36 counts and output 36 scrolling counts to the microcontroller 11. Therefore, in the present embodiment, the scrolling operation is a rotation operation performed on the scroll wheel 142. In practice, components that can be scrolled, e.g. bar-shaped touch plate, touch strip or touch band, can be the scrolling operation receiving device 14. In the present embodiment, the output interface 15 is a cable with a universal serial bus (USB) connector being disposed on one end, and the microcontroller 11 being electrically connected to the other end thereof. In practice, the above described mouse 1 can be realized by computer mice commonly available on the market, e.g. an optical mouse. Therefore, for description of other components of the mouse 1, one can refer to that of common computer mice.

Figure 5:
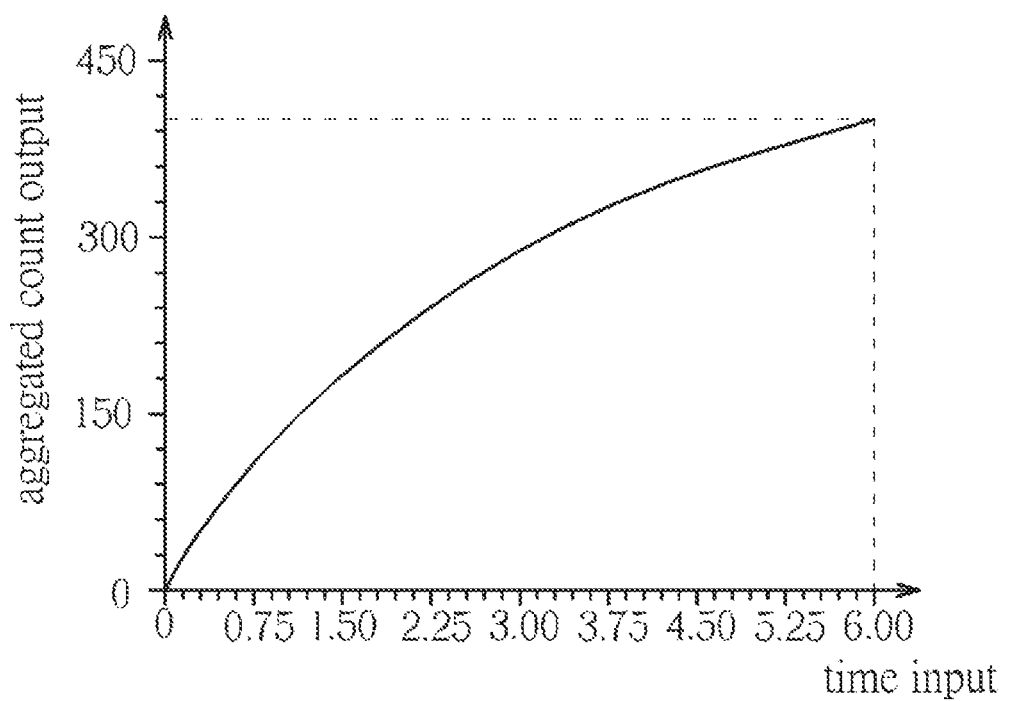
FIG. 5 is a schematic view illustrating a second predetermined scrolling output relation between time input and aggregated count output corresponding to a second accelerating output state.

Compared with computer mice in the prior art, the mouse 1 of the present disclosure can accelerate scrolling input or output accelerated scrolling output. The accelerated scrolling output is not proportional to the scrolling operation performed by the user on the scrolling input receiving device 14, and thus can be seen as virtual scrolling output to the computer. Furthermore, in the present embodiments, the microcontroller 11 has an initial output state, a first accelerating output state, a second accelerating output state, and a third accelerating output state, that is to say, the microcontroller 11, or the mouse 1, operates selectively in the initial output state, the first accelerating output state, the second accelerating output state, and the third accelerating output state. A first predetermined scrolling output relation between time input and aggregated count output corresponding to the first accelerating output state, a second predetermined scrolling output relation between time input and aggregated count output corresponding to the second accelerating output state, and a third predetermined scrolling output relation between time input and aggregated count output are stored in the microcontroller, as shown in FIG. 5.

When operating in one of the accelerating output states, the microcontroller 11 outputs the scrolling count value according to the predetermined scrolling output relation that corresponds to said accelerating output state. In practice, aforementioned the scrolling count value is the scrolling distance or rotation angle of the scroll wheel 142. One scrolling count can be seen as a unit scrolling distance or a unit rotation angle made by the scroll wheel 142. It should be understood that said scrolling distance or rotation angle does not correspond to the actual scrolling input of the scroll wheel 142 received by the scrolling input receiving device 14; instead, they are virtual scrolling input generated in accordance with the predetermined scrolling output relations of the scroll wheel 142. The computer receives the scrolling count value as the scrolling operation performed by the user on the mouse 1. For example, if the scrolling count value is 5, the computer determines that the user scrolls the scroll wheel 142 of the scrolling input receiving device 14 by 5 unit distances or 5 unit rotation angles, and performs corresponding command, e.g. scrolling the document or the webpage by 5 unit distances.

Figure 3:
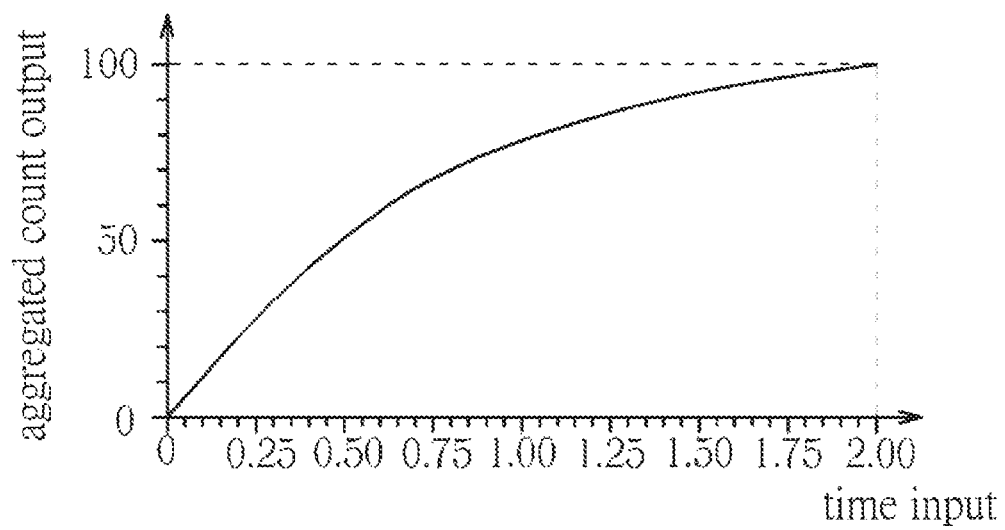
FIG. 3 is a schematic view illustrating a first predetermined scrolling output relation between time input and aggregated count output corresponding to a first accelerating output state.

Taking the first predetermined scrolling output relation for example, as shown in FIG. 3, when the microcontroller 11 operates in the first predetermined scrolling output state, the scrolling count output is 0 when the time input is 0 second, that is to say, the scrolling output count outputted by the microcontroller 11 via the output interface 15 does not change, or to say, does not increase or add up. When the time input is 0.05 second, the scrolling output count is 5, i.e. the microcontroller 11 outputs a scrolling count value that increases by 5 via the output interface 15. Moreover, when the time input is 0.1 second, the scrolling count value is 10, which is greater than that of the previous time point, i.e. time input at 0.05 second, by 5. Accordingly, the microcontroller 11 outputs 5 more scrolling counts via the output interface 15. In practice, the way in which the microcontroller 11 outputs the scrolling count value to the computer depends on the communication protocol between the mouse 1 and the computer. In practice, the scrolling count value outputted by the microcontroller 11 can be the increase amount, that is, the difference between the scrolling count at the current time point and that at the previous time point. For instance, when the time input is 0.05 second, the microcontroller 11 outputs an increase amount of 5; when the time input is 0.1 second, the microcontroller 11 outputs an increase amount of 5. The scrolling count value outputted by the microcontroller 11 can be the aggregated count, that is, the microcontroller 11 directly outputs the corresponding aggregated count output. The scrolling count value can be seen as virtual scrolling distance or rotation angle of the scroll wheel 142 of the scrolling input receiving device 14 since the starting time point. For example, the time input at 0 second can be taken as the starting time point. For concise description, the scrolling count value is set to be 0 is at 0 second. For instance, when the time input is at 0 second, the microcontroller 11 outputs 0 as the scrolling count value, and if the scrolling count value is 3 at 0 second, the microcontroller 11 outputs 3 as the scrolling count value when the time input is at 0 second; when the time input is 0.05 second, the microcontroller 11 outputs 5 as the scrolling count value; and when the time input is 0.1 second, the microcontroller 11 outputs 10 as the scrolling count value.

Furthermore, in the present embodiment, the microcontroller 11 outputs the scrolling count value periodically. For example, the microcontroller 11 performs the output every 0.05 seconds via the output interface 15 to the computer. Therefore, the first predetermined scrolling output relation of FIG. 3 can be a plurality of discrete data put together. The pattern of these discrete data can be understood as the scrolling count value of the microcontroller 11. According to the first predetermined scrolling output relation, the aggregated count output starts with an increase rate higher than later time points. That is, the rate at which the aggregated count output changes decreases progressively. The aggregated count output reaches an upper limit, e.g. 100 in the end. From another perspective, the scrolling count value can be seen as the simulation of actual scrolling movement of the scroll wheel 142 caused by the user. To be specific, when the user scrolls the scroll wheel 142 using the finger, the scroll wheel 142 starts rotating at an accelerated speed, which corresponds to the increase rate of the scrolling count value around the starting time point, and when the user's finger leaves the scroll wheel 142, the scroll wheel 142 keeps rotating due to inertia, and then the scrolling rate of the scroll wheel 142 decreases until the scroll wheel 142 stops at last, which corresponds to the progressive decrease of the aggregated count output. Accordingly, through the design of these discrete data, different scenarios can be simulated. In practice, the first predetermined scrolling output can be realized as a functional equation as follows:

$$C(t)=a_0+a_1t+a_2t^2+a_3t^3$$

The first derivative of the above equation is:

$$C'(t)=a_1+2a_2t+3a_3t^2$$

The C(t) is the aggregated count output, with t being time input and $a_0$, $a_1$, $a_2$, $a_3$ being the coefficients of the polynomial. In $a_0$, $a_1$, $a_2$, $a_3$ can be solved with boundary conditions. In the present embodiment, referring to FIG. 3, the boundary conditions are C(O)=0, C(2)=100, C'(O)=5, and C'(2)=0. It should be noted that, C'(t) is a time derivative of C(t). Therefore, in practice, the cubic polynomial function can be determined with coefficients $a_0$, $a_1$, $a_2$, $a_3$ and the boundary conditions. Moreover, in practice, the scrolling count value is outputted in an integer format. Therefore, under the condition that the predetermined scrolling output relation is realized as a function, the method of rounding can be adopted when solving the function, e.g. the cubic function described above. In addition, either in the form of discrete data or a polynomial function, the first predetermined scrolling output relation is stored in the microcontroller 11. For example, the discrete data can be stored in the form of number pairs, and in the second case, the coefficients of the polynomial function and the ranges of the variables are stored.

The above description regarding the first predetermined scrolling output relation can be applied to the second predetermined scrolling output relation and the third predetermined scrolling output relation. In the present embodiment, the first predetermined scrolling output relation presents the pattern in which 100 aggregated counts are outputted in two seconds, that is, the scrolling distance or rotation angle reaches 100 unit distances or unit rotation angles in two seconds. The second predetermined scrolling output relation presents the pattern in which 200 aggregated counts are outputted in four seconds, that is, the scrolling distance or rotation angle reaches 200 unit distances or unit rotation angles in four seconds. The third predetermined scrolling output relation presents the pattern in which 400 aggregated counts are outputted in six seconds, that is, the scrolling distance or rotation angle reaches 400 unit distances or unit rotation angles in six seconds. However, the present disclosure is not limited thereto. In practice, the total aggregated counts and the time range of the predetermined scrolling output relation can be set according to the products. Moreover, in the present embodiment, the first predetermined scrolling output relation defines a first initial output rate, e.g. 5 counts per 0.05 seconds, which corresponds to C'(O)=5 described above; the second predetermined scrolling output relation defines a second initial output rate, e.g. 6 counts per 0.05 seconds; the third predetermined scrolling output relation defines a third initial output rate, e.g. 7 counts per 0.05 seconds. The third initial output rate is greater than the second initial output rate, and the second initial output rate is greater than the first initial output rate. However, the present disclosure is not limited thereto. For example, the second initial output rate can be smaller than the first initial output rate. In addition, when the microcontroller 11 outputs the scrolling count value according to the first, second and third predetermined scrolling output relation, the scrolling of the scroll wheel 142 of the scrolling input receiving device 14 does not affect the output of the scrolling count value, that is, there is no correlation between the actual scrolling and the scrolling count value, except for certain scrolling operation, e.g. further acceleration, terminated acceleration, which will be further described below.

In addition, when the microcontroller 11 operates in the initial output state, the microcontroller 11 outputs the scrolling count value in accordance with the actual scrolling distance or rotation angle of the scroll wheel 142 via the output interface 15. In this case, the scrolling count value is proportional to the actual scrolling distance or rotation angle of the scroll wheel 142, for example, in direct proportion thereto. Furthermore, since the scroll wheel 142 does not actually scroll when the microcontroller operates in the first predetermined scrolling output relation, the second predetermined scrolling output relation, or the third predetermined scrolling output relation, when microcontroller 11 operates in an accelerating output state when outputting the scrolling count value in accordance with the first predetermined scrolling output relation, the second predetermined scrolling output relation, or the third predetermined scrolling output state.

When the mouse 1 is used, the microcontroller 11 detects a scrolling operation performed on the scrolling input receiving device 14 using the scrolling input receiving device 14, and determines if the scrolling operation satisfies a trigger condition so as to determine the operation state and the way of outputting the scrolling operation. In the present embodiment, the microcontroller 11 generates an aggregated count value, e.g. the scrolling distance or rotation angle of the scroll wheel 142, using the scrolling input receiving device 14 by aggregating the scrolling count of the scrolling operation during a preset time interval. When the microcontroller 11 determines if the aggregated count value is greater than a predetermined value, and the microcontroller 11 selectively switches the operation state or stay in the current operation state according to the current operation state, e.g. the aforementioned initial output state, the first accelerating output state, the second accelerating output state, and the third accelerating output state, in which the trigger condition is the aggregated count value, which is aggregated scrolling counts, being greater than the predetermined value. In practice, whenever the user scrolls the scroll wheel 142, the microcontroller 11 aggregates the scrolling counts during the preset time interval, and then determines if the aggregated count value if greater than the predetermined value. In one specific embodiment, the preset time interval is 0.1 seconds, 0.2 seconds or other number of seconds. In the present embodiment, the preset time interval is 0.1 seconds, and the predetermined value is 10. Therefore, when the user scrolls the scroll wheel 142 such that the aggregated count value is greater than the predetermined value, i.e. the trigger condition is satisfied, the microcontroller 11 is triggered to selectively switch the operation state thereof or stay in the current operation state. When the microcontroller 11 determines that the scrolling operation is not satisfied, the microcontroller 11 stays in or switches to the initial output state, and outputs the scrolling count value in direct proportion to the actual scrolling amount of the scroll wheel 142 of the scrolling input receiving device 14 via the output interface 15.

Figure 6:
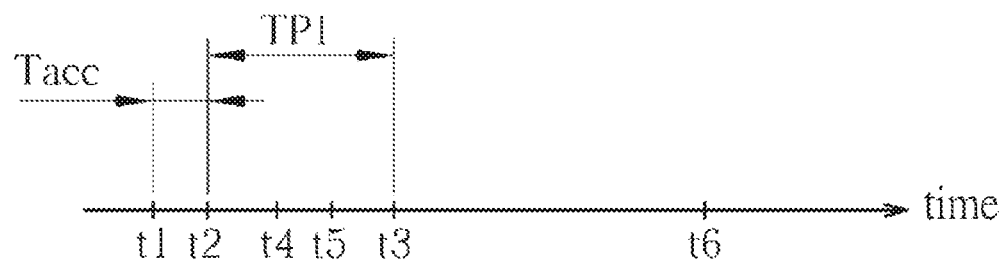
FIG. 6 is a time axis illustrating the microcontroller of the mouse switching from an initial output state to a first accelerating output state.

One specific embodiment is illustrated using the timeline of FIG. 6. The microcontroller 11 starts with the initial output state. The microcontroller 11 detects, via the scrolling input receiving device 14, a scrolling operation starting to be performed on the scrolling input receiving device 14 at time point t1, that is, the user starts to scroll the scroll wheel 142. The microcontroller 11 starts to aggregate the count of the scrolling of the scroll wheel 142. The microcontroller 11 continues to aggregate the scrolling count until the time point t2, that is, the aggregation continues for a preset time interval Tacc, in which the Tacc equals the interval between the time point t2 and the time point t1. In practice, the user scrolls the scroll wheel 142 for a time interval longer than the preset time interval Tacc. Furthermore, in practice, the starting point of the preset time interval Tacc is not limited to the time point t1; the starting point can be at a later time point than the time point t1. For concise description, the time point t1 at which the scrolling operation starts to be sensed by the microcontroller 11 via the scrolling input receiving device 14 is taken as the starting point of the preset time interval Tacc in the following description. Next, the microcontroller 11 determines whether the aggregated count value is greater than a predetermined value, i.e. the microcontroller 11 determines whether the scrolling operation satisfies a trigger condition. For concise description, the time where the microcontroller 11 performs the determination is set to be the time point t2, or to say, the microcontroller 11 determines if the aggregated count value is greater than the predetermined value once the preset time interval Tacc ends. However, the present disclosure is not limited thereto. For example, the time of determination can be at a time later than the time point t2. Moreover, to make the description concise, the time required for the microcontroller 11 to process data, switch the operation state, control the components, etc. is ignored in the present specification.

Considering that in the present embodiment, the microcontroller 11 operates in the initial output state at time point t2, when the microcontroller 11 determines, at time point t2, that the aggregated count value is greater than the predetermined value, or to say, the microcontroller 11 determines that the scrolling operation satisfies the trigger condition at time point t2, the microcontroller 11 switches to (or enters) the first accelerating output state at a later time point and outputs the scrolling count value in accordance with the first predetermined scrolling output relation via the output interface 15. In practice, the time where microcontroller 11 switches its operation state can be later than time point t2, but for concise description, the switch time point is set to be time point t2. Next, the microcontroller 11 stays in the first accelerating output state until time point t3, or to say, the microcontroller 11 operates for a first predetermined time interval TP1, in which the first predetermined time interval TP1 equals the difference between time point t3 and the time point t2. In the present embodiment, the first predetermined time interval TP1 corresponding to the first predetermined scrolling output relation is 2 seconds. It should be noted that, if the microcontroller 11 does not detect a scrolling operation that satisfies the trigger condition before the first predetermined time interval TP1 ends, the microcontroller 11 will output the scrolling count value according to the first predetermined scrolling output relation during the entire first predetermined time interval TP1, that is, outputting 100 units of aggregated count value in 2 seconds, and the microcontroller 11 resumes operating in the initial output state when the first predetermined time interval TP1 ends, i.e. the microcontroller 11 switches to the initial output state at time point t3. In addition, in practice, the predetermined time interval Tacc is far shorter than the first predetermined time interval TP1; however, for concise description, time points t1, t2, and t3 of FIG. 6 are not illustrated according to actual time scale.

Figure 7:
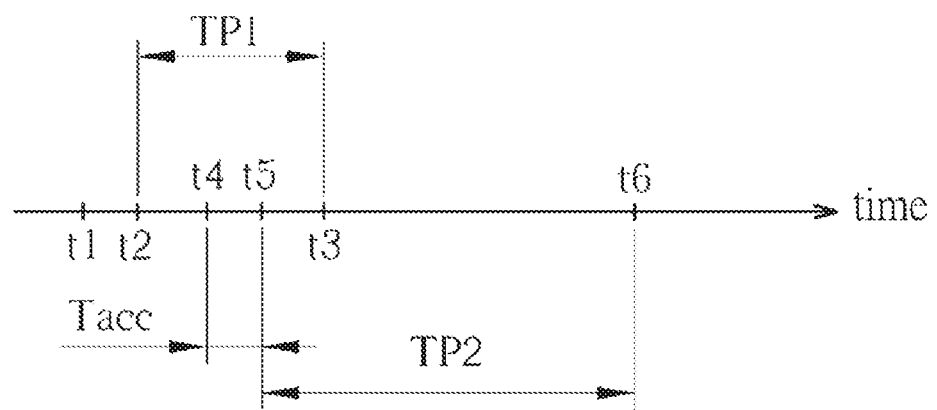
FIG. 7 is a time axis illustrating the microcontroller of the mouse switching from the first accelerating output state to a second accelerating output state.

With reference to FIG. 7, if the microcontroller 11 detects, via the scrolling input receiving device 14, another scrolling operation performed on the scrolling input receiving device 14 before the first predetermined time interval TP1 ends, the microcontroller 11 starts another aggregation of scrolling counts of the scrolling of the scroll wheel 142. Similarly, the microcontroller 11 continues to aggregate the scrolling count until time point t5, or to say, continues to aggregate for the predetermined time interval Tacc, so as to generate another aggregated count value. Since the microcontroller 11 operates in the first accelerating output state at time point t5, or to say, the current operation state of the microcontroller 11 is the first accelerating output state, when the microcontroller 11 determines, at time point t5, that the aggregated count value is greater that a predetermined value, i.e. the trigger condition is satisfied once again, the microcontroller 11 switches to the second accelerating output state at a later time point, which is set to be time point t5 for brief illustration, and outputs the scrolling count value in accordance with the second predetermined scrolling output relation via the output interface 15. Next, the microcontroller 11 continues operating in the second accelerating output state until time point t6, or to say, operating in said state for a second predetermined time interval TP2, in which the second predetermined time interval TP2 equals the difference between time point t6 and time point t5. In a specific embodiment, the second predetermined time interval TP2 corresponding to the second predetermined scrolling output relation lasts 4 seconds. Similarly, if the microcontroller 11 does not detect a scrolling operation satisfying the trigger condition before the second predetermined time interval TP2 ends, the microcontroller 11 will output the scrolling count value according to the second predetermined scrolling output relation during the entire second predetermined time interval TP2, that is, outputting 200 units of aggregated count value in 4 seconds, and the microcontroller 11 resumes operating in the initial output state when the second predetermined time interval TP2 ends, i.e. the microcontroller 11 switches to the initial output state at time point t6. In addition, in practice, the predetermined time interval Tacc is far shorter than the second predetermined time interval TP2; however, for concise description, time points t4, t5, and t6 of FIG. 7 are not illustrated according to actual time scale. It should be noted that, in the present embodiment, time point t5 is before time point t3, and if time point t5 is later than time point t3, the microcontroller 11 will switch from the initial output state to the first accelerating output state at time point t5, since the microcontroller 11 operates in the initial output state at time point t5 already.

Figure 8:
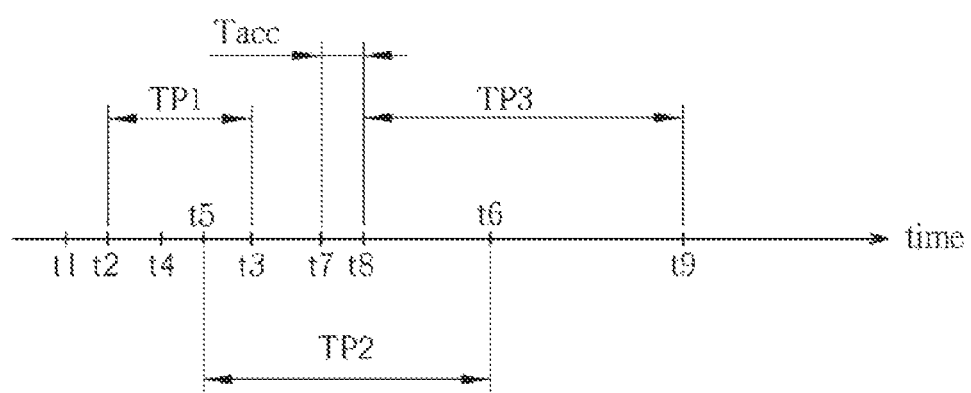
FIG. 8 is a time axis illustrating the microcontroller of the mouse switching from the second accelerating output state to a third accelerating output state.

Referring to FIG. 8, if the microcontroller 11 detects, via the scrolling input receiving device 14, another scrolling operation performed on the scrolling input receiving device 14 before the second predetermined time interval TP2 ends, i.e. before time point t7, the microcontroller 11 starts to aggregation of the scrolling count of the scrolling of the scroll wheel 142. Similarly, the microcontroller 11 continues to aggregate the scrolling count until time point t8, or to say, continues to aggregate for the predetermined time interval Tacc, so as to generate another aggregated count value. Since the microcontroller 11 operates in the second accelerating output state at time point t8, or to say, the current operation state of the microcontroller 11 is the second accelerating output state, when the microcontroller 11 determines, at time point t8, that the aggregated count value is greater that the predetermined value, i.e. the trigger condition is satisfied once again, the microcontroller 11 switches to the third accelerating output state at a later time point, which is set to be time point t5 for brief illustration, and outputs the scrolling count value in accordance with the third predetermined scrolling output relation via the output interface 15. Next, the microcontroller 11 continues operating in the second accelerating output state until time point t9, or to say, operating in said state for a third predetermined time interval TP3, in which the third predetermined time interval TP3 equals the difference between time point t9 and time point t8. In a specific embodiment, the third predetermined time interval TP3 corresponding to the second predetermined scrolling output relation lasts 6 seconds. Similarly, if the microcontroller 11 does not detect a scrolling operation satisfying the trigger condition before the third predetermined time interval TP3 ends, the microcontroller 11 will output the scrolling count value according to the third predetermined scrolling output relation during the entire third predetermined time interval TP3, that is, outputting 400 units of aggregated count value in 6 seconds, and the microcontroller 11 resumes operating in the initial output state when the third predetermined time interval TP3 ends, i.e. the microcontroller 11 switches to the initial output state at time point t9. In addition, in practice, the predetermined time interval Tacc is far shorter than the third predetermined time interval TP3; however, for concise description, time points t7, t8, and t9 of FIG. 8 are not illustrated according to actual time scale. It should be noted that, in the present embodiment, time point t8 is before time point t6, and if time point t8 is later than time point t6, the microcontroller 11 will switch from the initial output state to the first accelerating output state at time point t5, since the microcontroller 11 operates in the initial output state at time point t8 already.

Figure 9:
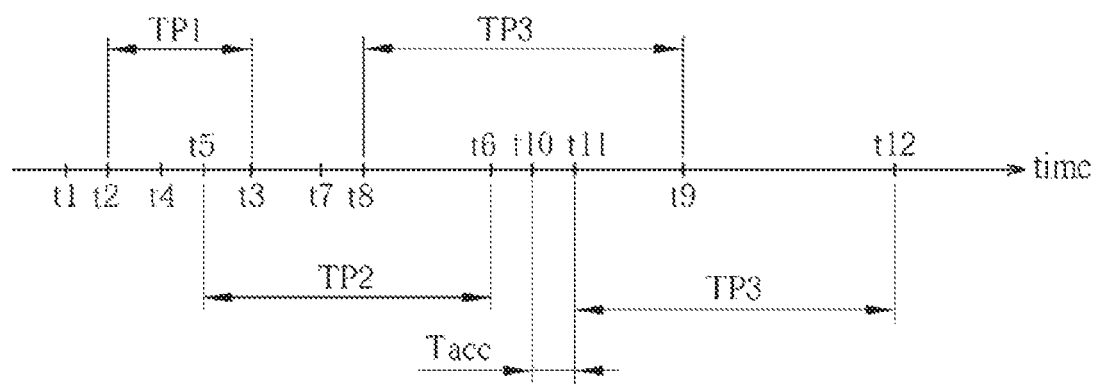
FIG. 9 is a time axis illustrating the microcontroller of the mouse entering the third accelerating output state from the third accelerating output state.

Referring to FIG. 9, if the microcontroller 11 detects, via the scrolling input receiving device 14, another scrolling operation performed on the scrolling input receiving device 14 before the third predetermined time interval TP3 ends, the microcontroller 11 starts another aggregation of scrolling counts of the scrolling of the scroll wheel 142. Similarly, the microcontroller 11 continues to aggregate the scrolling count until time point t11, or to say, continues to aggregate for the predetermined time interval Tacc, so as to generate another aggregated count value. Since the microcontroller 11 operates in the highest accelerating output state (i.e. the third accelerating output state) at time point t11, when the microcontroller 11 determines, at time point t11, that the aggregated count value is greater that the predetermined value, i.e. the trigger condition is satisfied once again, the microcontroller 11 reenters the third accelerating output state at a later time point, which is set to be time point t11 for brief illustration, and outputs the scrolling count value in accordance with the third predetermined scrolling output relation via the output interface 15. In other words, the microcontroller 11 stays in the third accelerating output state and outputs the scrolling count value in accordance with the third predetermined scrolling output relation from the starting point thereof, i.e. outputs 400 units of aggregated count value in 6 seconds. Next, the microcontroller 11 continues operating in the third accelerating output state until time point t12, or to say, operating in said state for a third predetermined time interval TP3, in which the third predetermined time interval TP3 equals the difference between time point t12 and time point t11. Similarly, if the microcontroller 11 detects a scrolling operation satisfying the trigger condition before the third predetermined time interval TP3 ends, i.e. before time point t12, the microcontroller 11 will reenter the third accelerating output state.

Based on the above description and FIGS. 6 to 9, it can be described in short that if the microcontroller 11 determines that the aggregated count value is greater than the predetermined value, i.e. the trigger condition is satisfied, the microcontroller 11 will enter an accelerating output state of a higher accelerating rate except that the microcontroller 11 is already in an accelerating output state of the highest accelerating rate. In the latter case, the microcontroller 11 will reenter this accelerating output state of the highest accelerating rate, and therefore the acceleration remains in effect. In this way, the microcontroller 11 can be triggered to accelerate repeatedly such that it accelerates continuously, e.g. from the first accelerating output state to the second accelerating output state, from the second accelerating output state to the third accelerating output state, and from the third accelerating output state to the third accelerating output state again.

Furthermore, in practice, when it is determined that the trigger condition is not satisfied, e.g. the aggregated count value is not greater than the predetermined value, the microcontroller 11 switches to (or resumes) the initial output state from, for example, one of the accelerating output states, or stays in the initial output state if the microcontroller 11 is not currently in one of the accelerating output states. With reference to FIG. 6, when the microcontroller 11 determines, at time point t2, that the aggregated count value does not exceed the predetermined value, i.e. the trigger condition is not satisfied, the microcontroller 11 stays in the initial output state. Referring to FIGS. 7, 8 and 9, when the microcontroller 11 determined, at time points t5, t8, and t11, that the aggregated count value does not exceed the predetermined value, i.e. the trigger condition is not satisfied, the microcontroller 11 switches to the initial output state from the first accelerating output state, the second accelerating output state, and the third accelerating output states respectively. However, the present disclosure is not limited thereto. For example, in other embodiments, the microcontroller 11 operates in one of the accelerating output states and does not respond to the scrolling operation in which the aggregated count value does not exceed the predetermined value, i.e. the microcontroller 11 continues to operate in said accelerating output state. In practice, a variable can be used to represent the operation states of the microcontroller 11. For instance, the variable can be set to range from 0 to 3, which respectively correspond to the initial output state, the first accelerating output state, the second accelerating output state, and the third accelerating output state. If the microcontroller 11 determines that the aggregated count value is not greater than the predetermined value, the microcontroller 11 set the variable to be 0, regardless of what the current variable value is, so that the microcontroller 11 switches to or stays in the initial output state, which helps simplify the programming of the firmware.

In previous embodiments, three accelerating output states are taken for example. However, the present disclosure is not limited thereto. For example, in other embodiments, there can be two, four or more accelerating output states. When the microcontroller 11 has only two accelerating output states, e.g. the first accelerating output state and the second accelerating output state, and determines that the aggregated count value is greater than the predetermined value, if the microcontroller 11 is currently in the second accelerating output state, the microcontroller 11 stays therein and outputs the scrolling count value according to the second predetermined scrolling output relation from the starting point thereof. In other embodiments where the microcontroller 11 has four or more accelerating output states and determines that the aggregated count value is greater than the predetermined value, if the microcontroller 11 operates in the last accelerating output state, then the microcontroller 11 continues to operate in the last accelerating output state and outputs the scrolling count value according to the predetermined scrolling output relation corresponding to said accelerating output state from the starting point thereof. On the other hand, in the present embodiment, the microcontroller 11 has at least one further accelerating output state of progressively higher accelerating rates, which can include the third accelerating output state, but the present disclosure is not limited thereto. Each of the further accelerating output states corresponds to a predetermined scrolling output relation between time input and aggregated count output, which is stored in the microcontroller 11. In practice, details of the first predetermined scrolling output relation can be applied to the predetermined scrolling output relations corresponding to each of the further accelerating output states respectively; one can refer to the above description for the details thereof, and the present specification will not further elaborate thereon. When the microcontroller 11 determines that the aggregated count value is greater than the predetermined value and the microcontroller 11 is operating in the second accelerating output state, the microcontroller 11 switches to the first one of the at least one further accelerating output states and outputs the scrolling count value according to the predetermined scrolling output relation corresponding to the first further accelerating output state via the output interface 15. If the microcontroller 11 is operating in the last one of the further accelerating output states, the microcontroller 11 stays in the last further accelerating output state and outputs the scrolling count value according to the predetermined scrolling output relation corresponding to the last further accelerating output state via the output interface 15.

Figure 4:
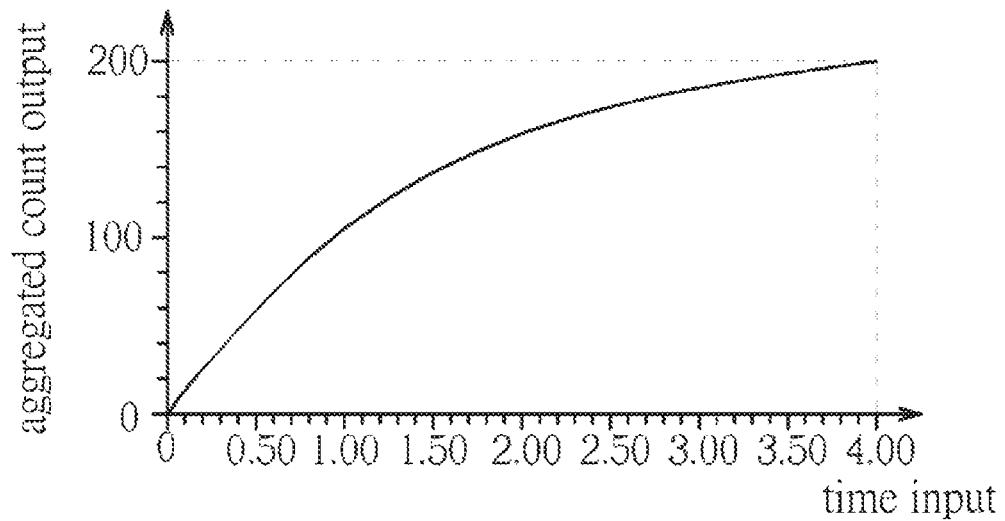
FIG. 4 is a schematic view illustrating a second predetermined scrolling output relation between time input and aggregated count output corresponding to a second accelerating output state.
Figure 10:
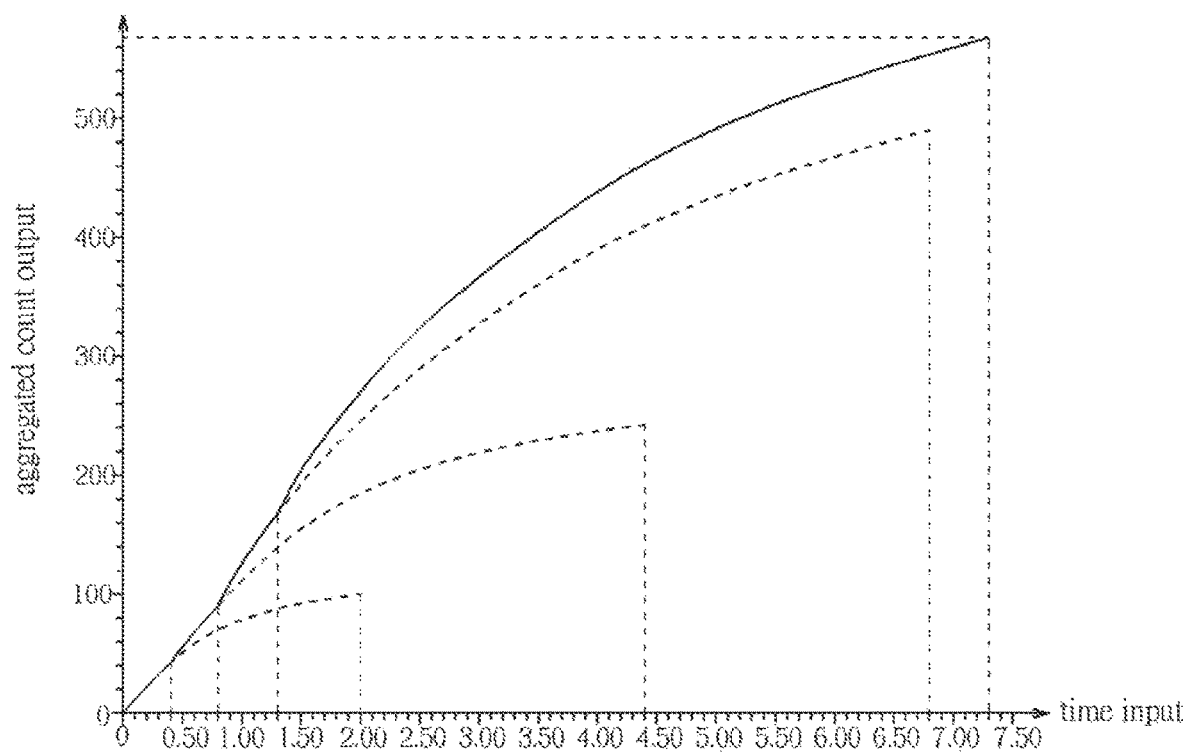
FIG. 10 is a schematic view illustrating the microcontroller switching from the first accelerating output state to the second accelerating output state, and to the third accelerating output state, and then to the third accelerating output state again, according to a specific embodiment of the present disclosure.

Please refer to FIG. 10, which illustrates a specific embodiment wherein the microcontroller 11 operates in a similar manner to that of FIG. 9, and outputs the scrolling count value according to different predetermined scrolling output relations at different time points. As shown in FIG. 10, the microcontroller 11 enters the first accelerating output state at time point t2, which is set to be 0 second, and is triggered to enter the second accelerating output state at 0.4 seconds, i.e. time point t5. Next, at 0.8 second, i.e. time point t8, the microcontroller 11 is triggered again and enters the third accelerating output state consequently. At last, the microcontroller 11 ends the accelerating output state and resumes the initial output state at 7.3 seconds, i.e. time point t12. Moreover, in FIG. 10, when the microcontroller 11 enters the second accelerating output state at 0.4 seconds, the microcontroller 11 outputs the scrolling count value according to the second predetermined scrolling output relation. In other words, the composite scrolling output relation from 0 second to 0.4 seconds is identical in shape to the scrolling output relation of FIG. 3 from 0 second to 0.4 seconds, and the composite scrolling output relation at the time range from 0.4 seconds to 0.8 seconds is identical in shape to the scrolling output relation of FIG. 4 from 0 second to 0.4 seconds, i.e. 0.8 seconds minus 0.4 seconds. In other words, the starting point of the second predetermined scrolling output relation shown in FIG. 4 corresponds to the first predetermined scrolling output relation of FIG. 10 at 0.4 seconds. Similarly, the microcontroller 11 enters the third accelerating output state at 0.8 seconds and outputs the scrolling count value in according with the third predetermined scrolling output relation. In other words, the composite scrolling output relation shown in FIG. 10 at the time range from 0.8 seconds to 1.3 seconds is identical in shape to the scrolling output relation of FIG. 5 from 0 second to 0.5 seconds. In other words, the starting point of the third predetermined scrolling output relation shown in FIG. 4 corresponds to the second predetermined scrolling output relation of FIG. 10 at 0.8 seconds. Furthermore, when the microcontroller 11 reenters the third accelerating output state at 1.3 seconds, the microcontroller 11 outputs the scrolling count value in accordance with the third predetermined scrolling output relation from the starting point thereof. In other words, the composite scrolling output relation in the time range from 1.3 seconds to 7.3 seconds is identical in shape to the scrolling output relation of FIG. 5 from 0 second to 6 seconds, i.e. 7.3 seconds minus 1.3 seconds. That is to say, the starting point of the third predetermined scrolling output relation shown in FIG. 5 corresponds to the second predetermined scrolling output relation of FIG. 10 at 1.3 seconds. Moreover, as shown in FIG. 10, when the microcontroller 11 enters the first accelerating output state and the accelerating output state is not ended, e.g. the scroll wheel 142 is not scrolled again or the aggregated count value is not greater than the predetermined value, the microcontroller 11 resumes the initial output state after 2 seconds, as the dashed line depicted. When the microcontroller 11 enters the second accelerating output state and the accelerating output state is not ended, e.g. the scroll wheel 142 is not scrolled again or the aggregated count value is not greater than the predetermined value, the microcontroller 11 resumes the initial output state after 4.4 seconds, as the dashed line depicted. If the accelerating output state of the microcontroller 11 is not ended after the microcontroller 11 enters the third accelerating output state, which starts at 0.8 seconds, the microcontroller 11 resumes the initial output state after 6.8 seconds. If the accelerating output state of the microcontroller 11 is not ended after the microcontroller 11 enters the third accelerating output state, which starts at 1.3 seconds, the microcontroller 11 resumes the initial output state after 7.3 seconds.

Figure 11:
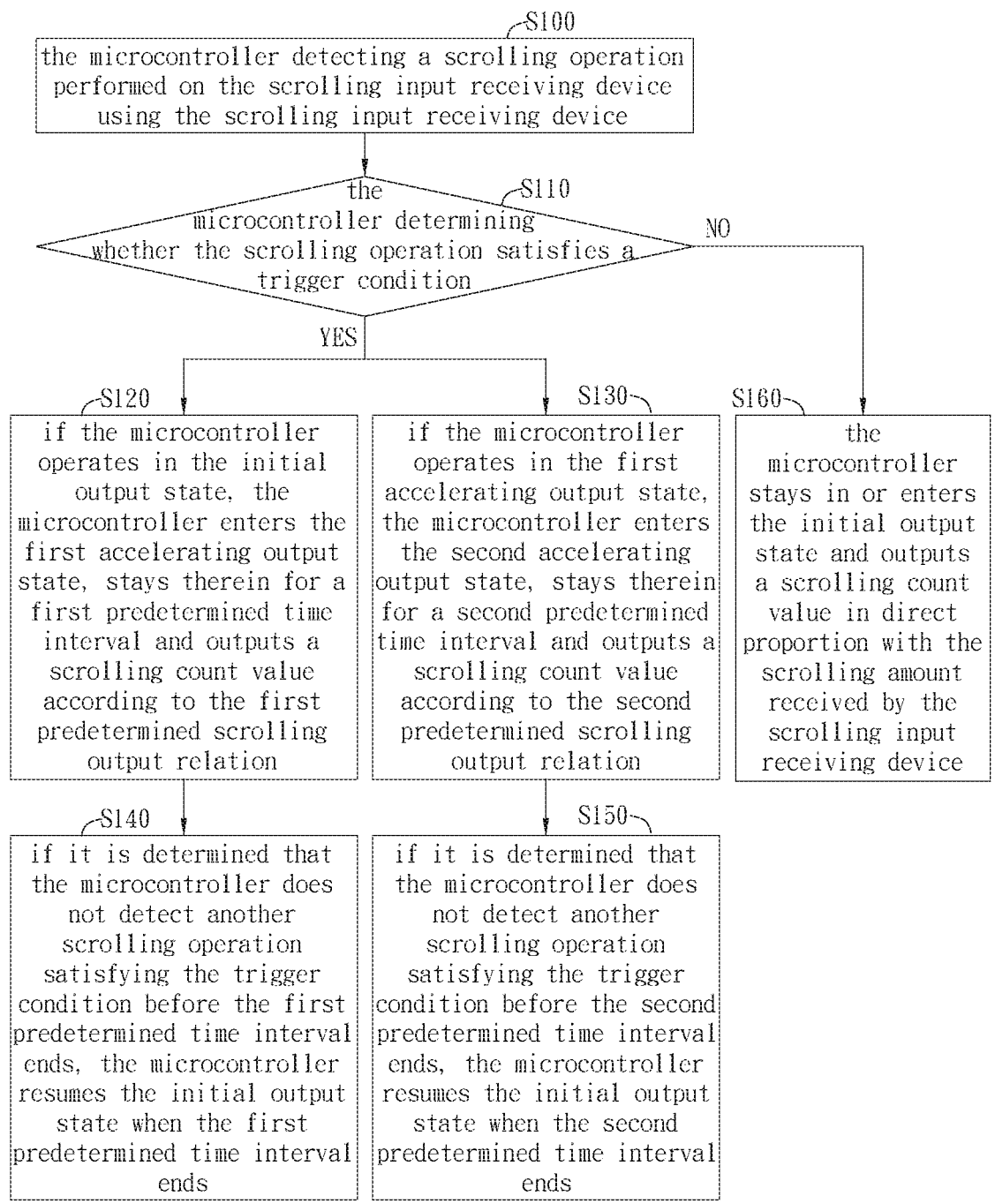
FIG. 11 is a flow chart illustrating a method of accelerating scrolling input.

Referring to FIG. 11, which shows the flow chart of a method of accelerating scrolling input of the present disclosure. For brief description, the method of accelerating scrolling input that will be described below uses the aforementioned mouse 1, and thus details about the mouse 1 will not be further described. According to the method of accelerating scrolling input, the microcontroller 11 detects, via the scrolling input receiving device 14, a scrolling operation performed on the scrolling input receiving device 14, as shown in step S100; next, the microcontroller 11 determines whether the scrolling operation satisfies a trigger condition, as shown in step S110; when the microcontroller 11 determines that the scrolling operation satisfies the trigger condition, the method of accelerating scrolling operation performs different steps in accordance with the operation state of the microcontroller 11. If the microcontroller 11 is operating in the initial output state, or it is determined that the microcontroller 11 operates in the initial output state before the scrolling operation is performed, the microcontroller 11 enters the first accelerating output state and stays therein for a first predetermined time interval and outputs the scrolling count value according to the first predetermined scrolling output relation, as shown in step S120; if the microcontroller 11 is operating in the first accelerating output state, or it is determined that the microcontroller 11 operates in the first accelerating output state before the scrolling operation is performed, the microcontroller 11 enters the second accelerating output state and stays therein for a second predetermined time interval and outputs the scrolling count value according to the second predetermined scrolling output relation, as shown in step S130. After step S120, if it is determined that the microcontroller 11 does not detect another scrolling operation satisfying the trigger condition before the first predetermined time interval ends, the microcontroller 11 resumes the initial output state when the first predetermined time interval ends, as shown in step S140. After step S130, if it is determined that the microcontroller 11 does not detect another scrolling operation satisfying the trigger condition before the second predetermined time interval ends, the microcontroller 11 resumes the initial output state when the second predetermined time interval ends, as shown in step S150. In practice, the method of accelerating scrolling input can further includes a step S160 of: if the microcontroller 11 determines that the scrolling operation does not satisfy the trigger condition, the microcontroller 11 stays in or enters the initial output state, and outputs the scrolling count value in direct proportion to the actual scrolling amount of the scrolling input receiving device 14.

In practice, the trigger condition can be the aggregated scrolling amount of the scroll wheel 142 during a predetermined time interval. Please refer to FIG. 12, which shows a flow chart of another method of accelerating scrolling input based on the logic of the method of FIG. 11. According to the method of accelerating scrolling input of FIG. 12, the microcontroller 11 detects, via the scrolling input receiving device 14, a scrolling operation performed on the scrolling input receiving device 14, as shown in step S200; the microcontroller 11 generates an aggregated count value via the scrolling input receiving device 14 by aggregating the scrolling count of the scrolling operation during a preset time interval, as shown in step S210; the microcontroller 11 determines whether the aggregated count value is greater than a predetermined value, that is, determines if a trigger condition is satisfied, as shown in step S220; when the microcontroller 11 determines that the aggregated count value is greater than the predetermined value, that is, the scrolling operation satisfies the trigger condition, the method of accelerating scrolling input performs different steps according to the operation state of the microcontroller 11. If the microcontroller 11 operates in the initial output state, the microcontroller 11 switches to the first accelerating output state and outputs a scrolling count value according to the first predetermined scrolling output relation, as shown in step S230; if the microcontroller 11 operates in the first accelerating output state, the microcontroller 11 switches to the second accelerating output state and outputs a scrolling count value according to the second predetermined scrolling output relation, as shown in step S240. Next, the microcontroller 11 switches to the initial output state, as shown in step S250. Similarly, the method of accelerating scrolling input can further include the microcontroller 11 a step of: when the microcontroller 11 determines that the aggregated count value is not greater than the predetermined value, that is, the scrolling operation does not satisfy the trigger condition, the microcontroller 11 stays in the initial output state, if the microcontroller 11 is operating in the in the initial output state, or switches to the initial output state, if the microcontroller 11 operates in the first accelerating output state or the second accelerating output state, and then the microcontroller 11 outputs the scrolling count value according to the actual scrolling amount of the scrolling input receiving device 14, as shown in step S260.

Figure 12:
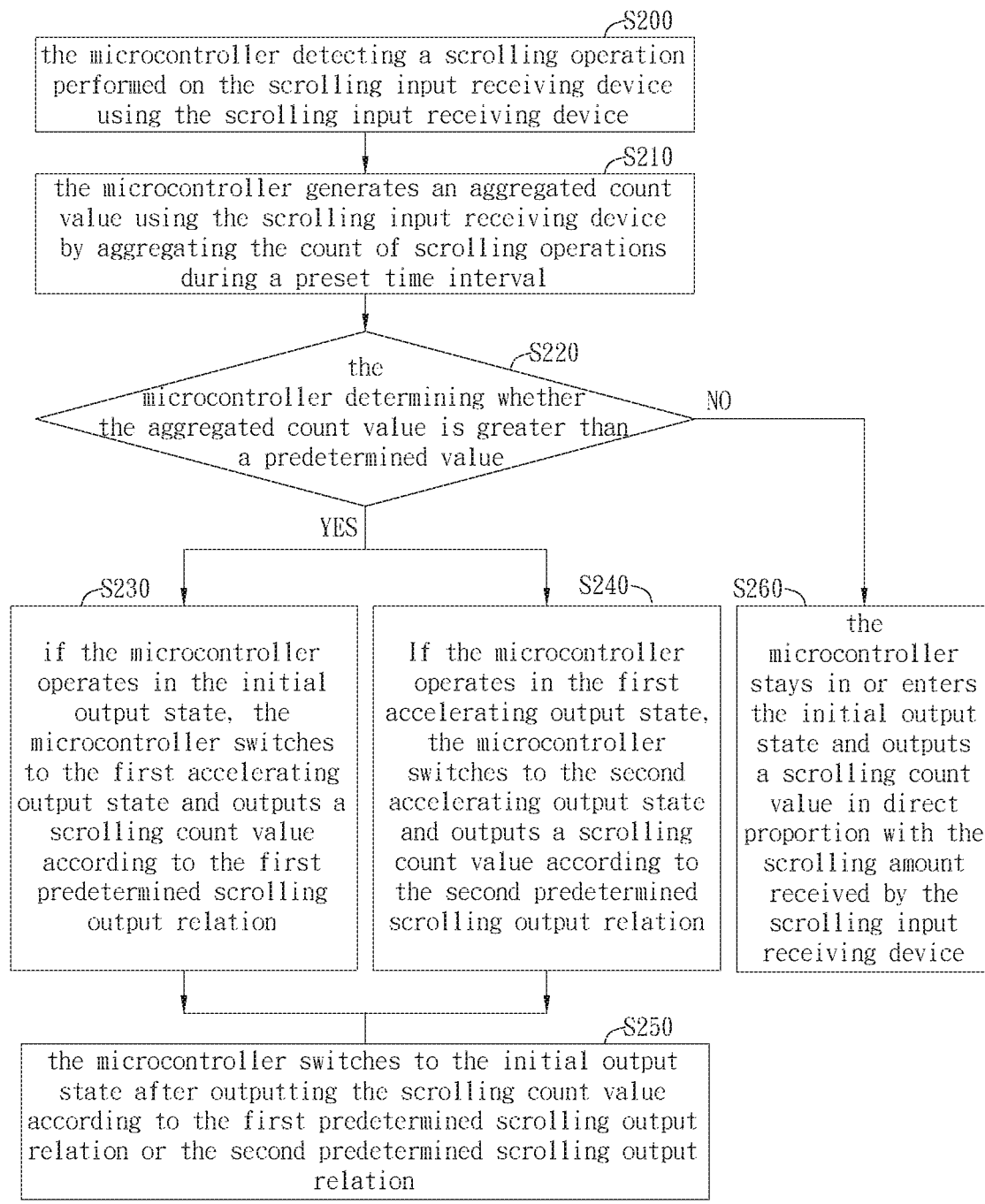
FIG. 12 is a flow chart illustrating another method of accelerating scrolling input.
Figure 13A:
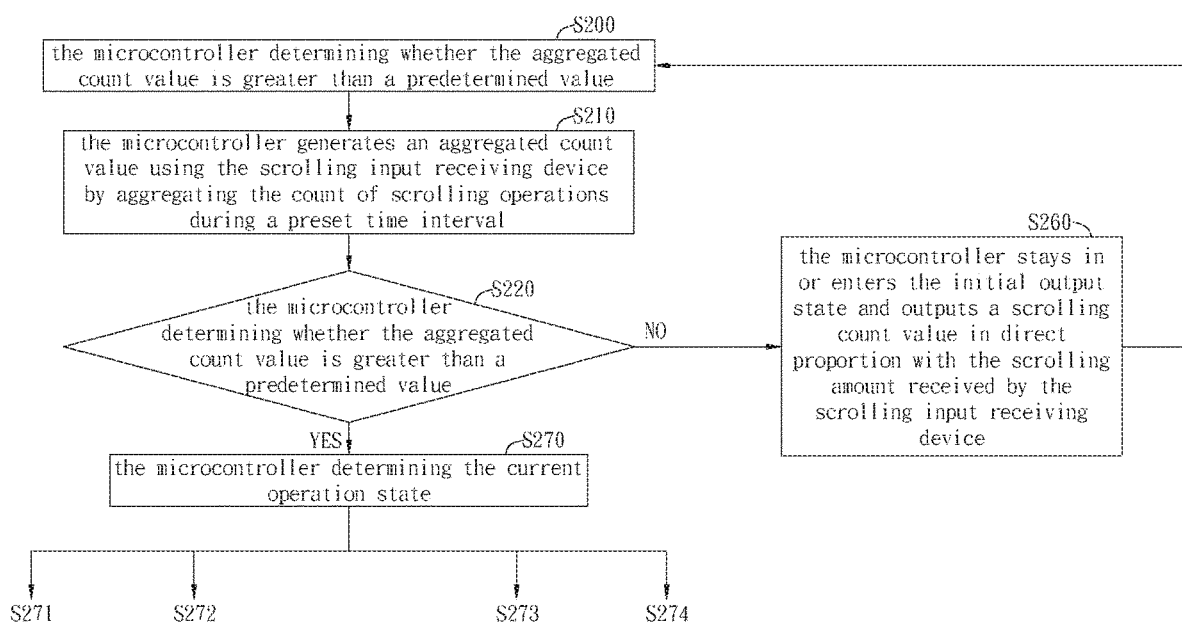
FIGS. 13A and 13B show a flow chart illustrating the method of accelerating scrolling input according to one embodiment of the present disclosure.
Figure 13B:
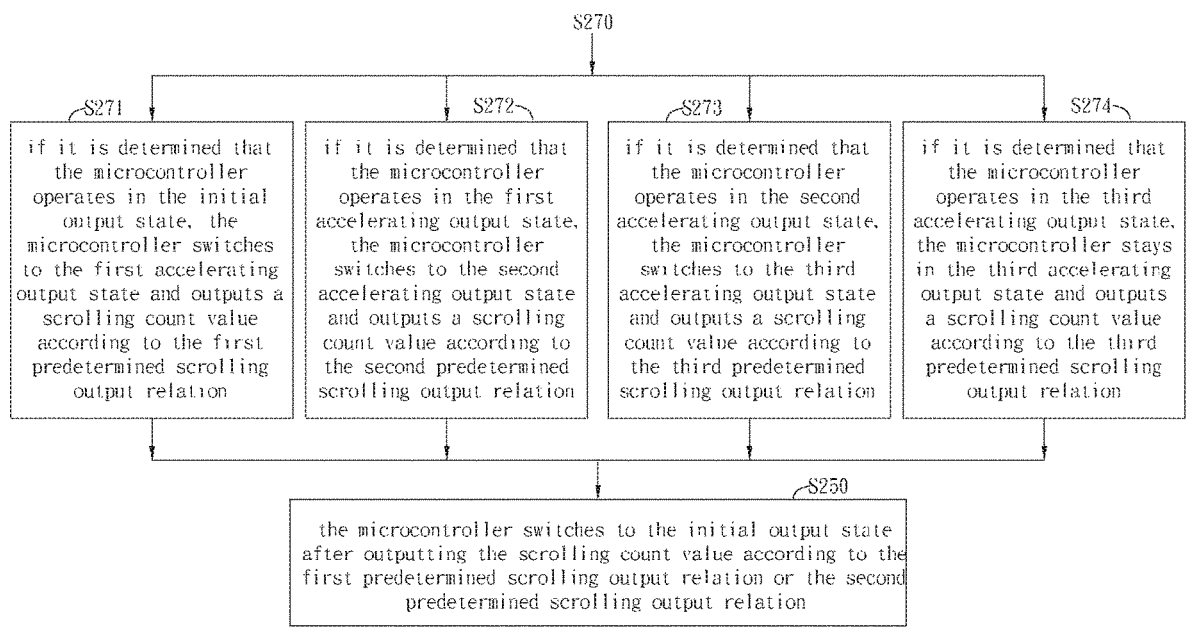

In FIGS. 13A and 13B, which show an embodiment of FIG. 12, the mouse 1 has three accelerating output states. With reference to FIGS. 13A and 13B, the step S230 and step S240 of FIG. 12 are exemplified as step S270 to step S274. If in step S220, the result of the determination is positive, i.e. the aggregated count value is greater than the predetermined value, the microcontroller 11 determines the current operation state by, for example, retrieving the variables representing the operation state of the microcontroller 11, as shown in step S270. If it is determined that the microcontroller 11 operates in the initial output state, the microcontroller 11 switches to the first accelerating output state and outputs a scrolling count value according to the first predetermined scrolling output relation, as shown in step S271; if it is determined that the microcontroller 11 operates in the first accelerating output state, the microcontroller 11 switches to the second accelerating output state from the first accelerating output state and outputs a scrolling count value according to the second predetermined scrolling output relation, as shown in step S272; if it is determined that the microcontroller 11 operates in the second accelerating output state, the microcontroller 11 switches to the third accelerating output state from the second accelerating output and outputs a scrolling count value according to the third predetermined scrolling output relation, as shown in step S273; if it is determined that the microcontroller 11 operates in the third accelerating output state, the microcontroller 11 continues to operate in the third accelerating output state, or to say, reenters the third accelerating output state and outputs a scrolling count value according to the third predetermined scrolling output relation from the starting point thereof, as shown in step S274. Furthermore, as shown in FIGS. 13A and 13B, after performing step S260, the method of accelerating scrolling input waits for another scrolling operation received by the scrolling input receiving device 14, and then returns to step S200, as shown in step S200.

Figure 14A:
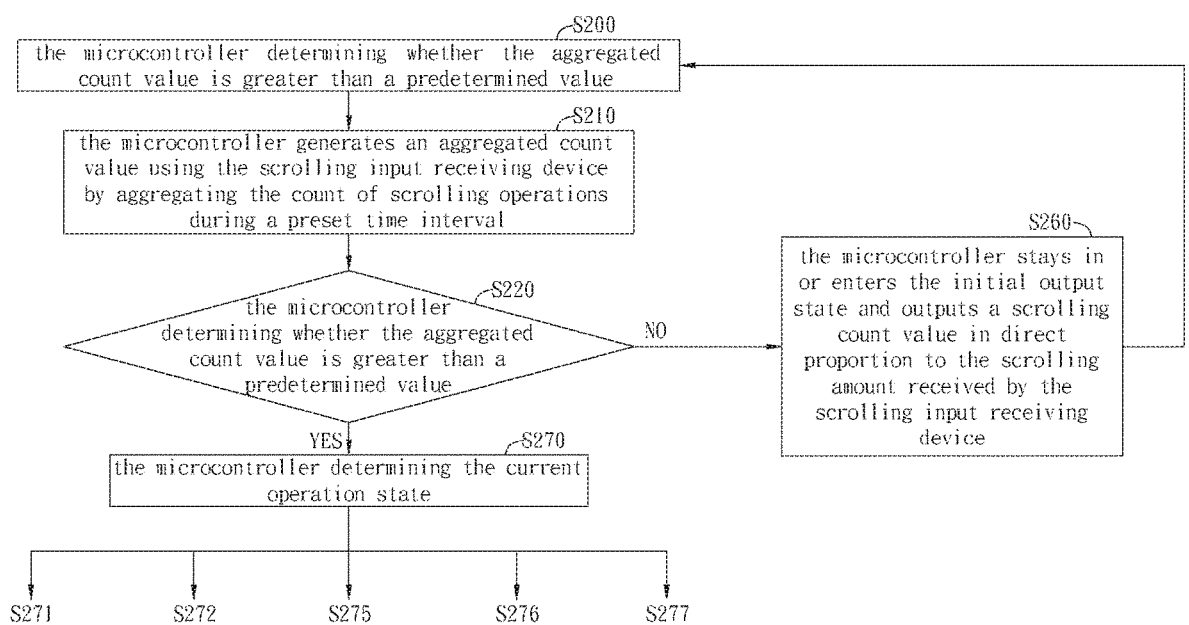
FIGS. 14A and 14B show a flow chart illustrating the method of accelerating scrolling input according to another embodiment of the present disclosure.
Figure 14B:
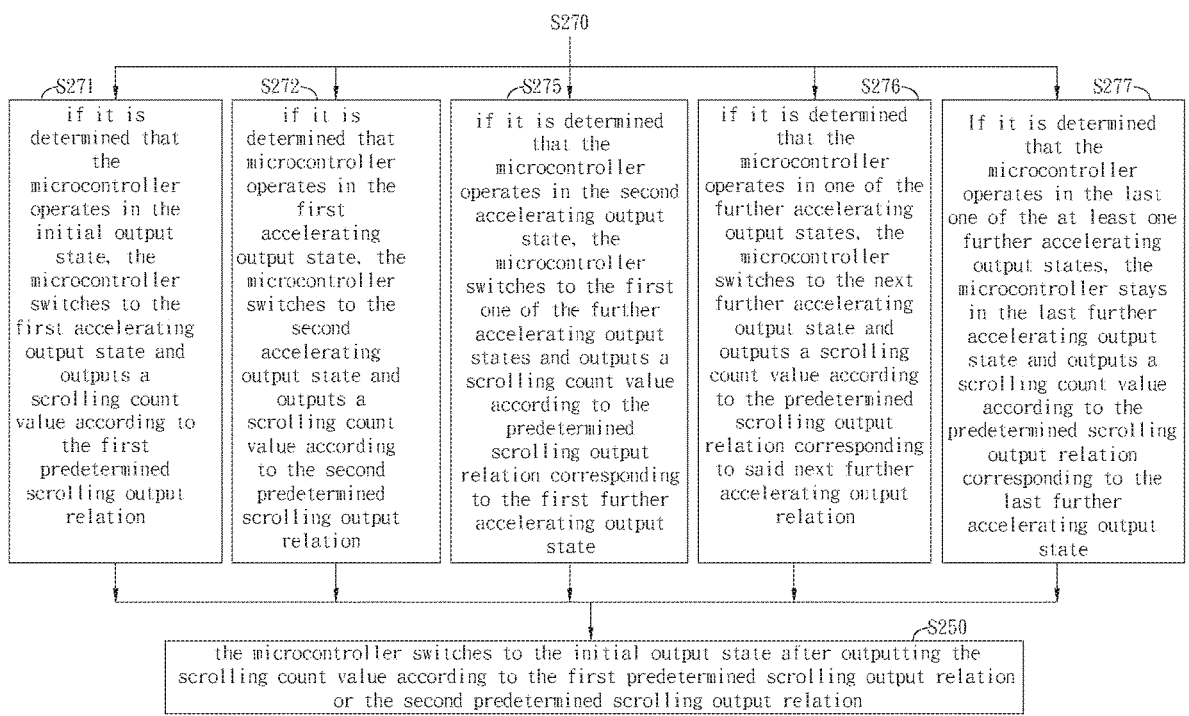

In addition, in the method of FIGS. 13A and 13B, the microcontroller 11 has three accelerating output states. However, the present disclosure is not limited thereto. The microcontroller 11 can have two, four or more accelerating output states. If the microcontroller 11 has only two accelerating output state, e.g. the first accelerating output state and the second accelerating output state, step S274 in FIGS. 13A and 13B are deleted, and step S273 is changed to be: when the microcontroller 11 operates in the second accelerating output state, the microcontroller 11 stays in or reenters the second accelerating output state and outputs the scrolling count value according to the second predetermined scrolling output relation. Similarly, if the microcontroller 11 has four or more accelerating output states, the method of accelerating scrolling input includes more steps similar to step S272 or step S273, in which step S274 is adjusted to be: when the microcontroller 11 operates in the last one of the accelerating output states, the microcontroller 11 stays in or reenters the last accelerating output state and outputs the scrolling count value according to the corresponding predetermined scrolling output relation. Therefore, in the present embodiment, the microcontroller 11 has at least one further accelerating output state, including, but not limited thereto the third accelerating output state. Each further accelerating output state corresponds to a predetermined scrolling output relation between time input and aggregated count output. Please refer to FIGS. 14A and 14B. The step S230 and step S240 of FIG. 12 are realized as steps S270, S271, S272, and S275 to S277 in FIGS. 14A and 14B. If it is determined that the microcontroller 11 operates in the second accelerating output state, the microcontroller 11 switches to the first one of the further accelerating output states and outputs a scrolling count value according to the predetermined scrolling output relation corresponding to the first further accelerating output state, as shown in step S275; if it is determined that the microcontroller 11 operates in one of the further accelerating output states but not in the last one thereof, the microcontroller 11 switches to the next further accelerating output state and outputs a scrolling count value according to the predetermined scrolling output relation corresponding to said next further accelerating output relation, as shown in step S276; if it is determined that the microcontroller 11 operates in the last one of the at least one further accelerating output states, the microcontroller 11 stays in, or reenters the last further accelerating output state and outputs a scrolling count value according to the predetermined scrolling output relation corresponding to the last further accelerating output state, as shown in step S277.

Figure 15A:
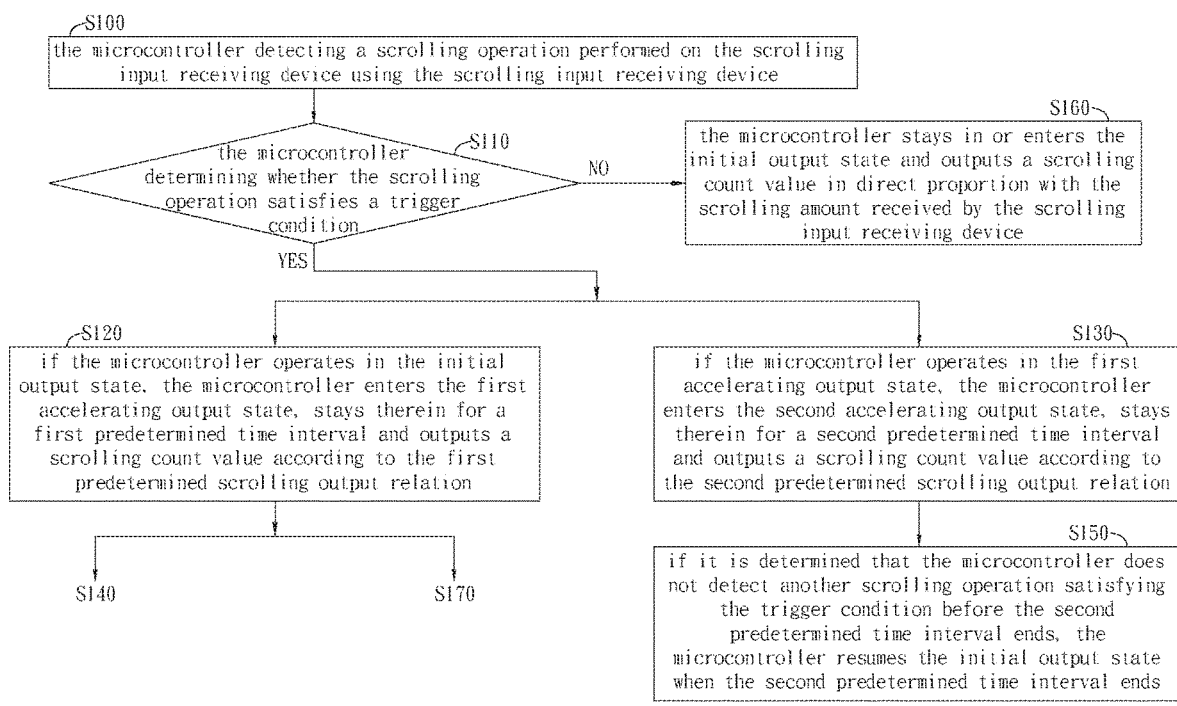
FIGS. 15A and 15B show a flow chart illustrating another method of accelerating scrolling input.
Figure 15B:
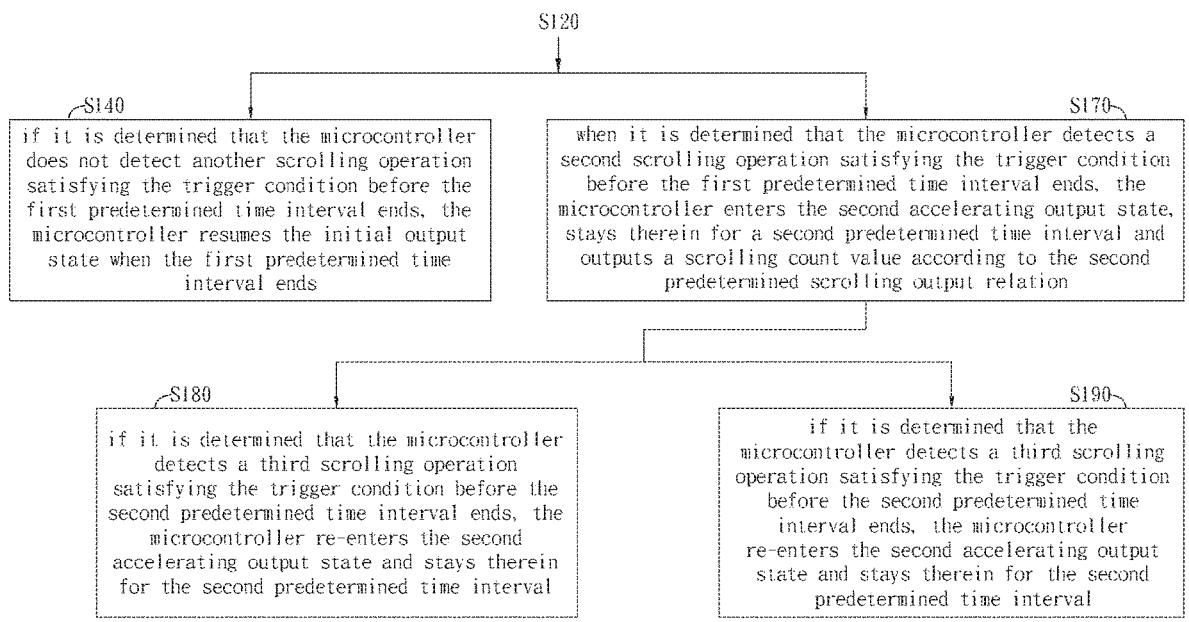

FIG. 11 illustrates the flow chart in which the microcontroller 11 switches the operation state thereof due to single trigger, or to say, the microcontroller 11 determining if the trigger condition is satisfied once. However, the present disclosure is not limited thereto. Please refer to FIGS. 15A and 15B, which shows the flow chart of the microcontroller 11 switching the operation states due to multiple triggers, i.e. the microcontroller 11 determines if the trigger condition is satisfied several times. According to FIGS. 15A and 15B, after step S120, if it is determined that the microcontroller 11 detects another scrolling operation satisfying the trigger condition before the first predetermined time interval ends, the microcontroller 11 enters the second accelerating output state, stays therein for a second predetermined time interval and outputs the scrolling count value according to the second predetermined scrolling output relation, as shown in step S170. Afterwards, if it is determined that the microcontroller 11 detects another scrolling operation satisfying the trigger condition before the second predetermined time interval ends, the microcontroller 11 stays in the second accelerating output state for the second predetermined time interval, as shown in step S180; if it is determined that the microcontroller 11 does not detect a scrolling operation satisfying the trigger condition before the second predetermined time interval ends, the microcontroller 11 resumes the initial output state when the second predetermined time interval ends, as shown in step S190. After step S180, the method can include the aforementioned step S180 and step S190, depending on if the microcontroller 11 detects another scrolling operation satisfying the trigger condition before the second predetermined time interval ends. In addition, after step S130, if the microcontroller 11 detects another scrolling operation satisfying the trigger condition before the second predetermined time interval ends, the method can further include other steps, e.g. step S180. Furthermore, the flow chart depicted in FIGS. 15A and 15B include two accelerating output states, i.e. the first accelerating output state and second accelerating output state. In other embodiments where three or more accelerating output states are applied, the flow chart of the embodiments can be derived based on the above description and FIGS. 11 to 14.

Figure 16:
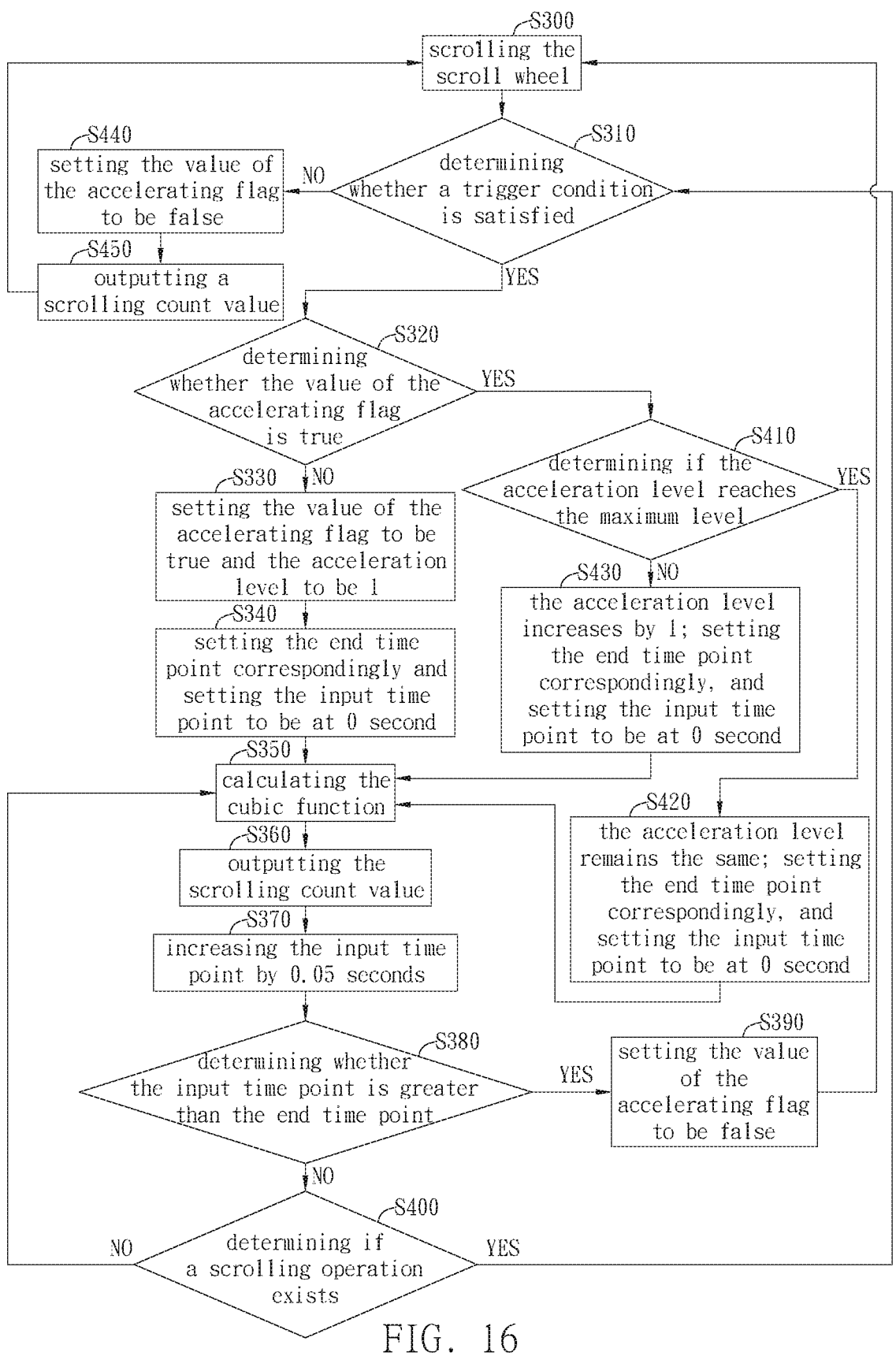
FIG. 16 is a flow chart illustrating the method of accelerating scrolling input according to a specific embodiment of the present disclosure.

It should be noted that, the above-described flow charts present only some of the embodiments applicable to the mouse 1. However, the present disclosure is not limited thereto. A person skilled in the art can derive more methods of accelerating scrolling input based on the aforementioned description, which includes the operation of the mouse 1, the flow charts and the description related thereto. Furthermore, in practice, the microcontroller 11 stores two variables: (a) accelerating flag, which is a Boolean variable used to record if the microcontroller 11 is operating in an accelerating output state, and (2) accelerating level, which is a numerical variable used to record at which accelerating output state the microcontroller 11 is currently in. As shown in FIG. 16, which shows the flow chart of a specific embodiment of the abovementioned method of accelerating scrolling input, the user scrolls the scroll wheel 142 of the scrolling input receiving device 14, as shown in step S300. In this step, the microcontroller 11 detects, via the scrolling input receiving device 14, a scrolling operation performed by a user on the scrolling input receiving device 14, i.e. on the scroll wheel 142. Next, the microcontroller 11 determines if the scrolling operation satisfies a trigger condition, as shown in step S310. In practice, the microcontroller 11 calculates if the aggregated scrolling count output responding to the scrolling operation on the scrolling input receiving device 14 during a time interval, e.g. within 0.1 seconds, in this step. When in step S310, the determination result is positive, i.e. the aggregated count value is greater than the predetermined value, the microcontroller 11 first determines the current operation state. Accordingly, the microcontroller 11 retrieves the accelerating flag and determines of the value accelerating flag is true, as shown in step S320.

If the determination result of step S320 is negative, i.e. the value of the accelerating flag is false, it means the microcontroller 11 was not in an accelerating output state before the trigger condition is satisfied, or to say, the microcontroller 11 was operating in the initial output state. The microcontroller 11 then sets the value of the accelerating flag to be true and the acceleration level to be 1, as shown in step S330. In the meanwhile, the microcontroller 11 switches from the initial output state to the first accelerating output state, and sets the acceleration level to be 1 or other value corresponding to the first accelerating output state. Since each predetermined scrolling output relation corresponds to an input time range that is different from each other, in the present embodiment, a variable is used to record the time point where the time input of the corresponding predetermined scrolling output relation ends, hereinafter "end time point", and another variable is used to record the time point where the aggregated count value according to the corresponding predetermined scrolling output relation is outputted, hereinafter "input time point". For instance, the end time point corresponding to the first predetermined scrolling output relation is at second 2, the end time point corresponding to the second predetermined scrolling output relation is at 4 second, and the end time point corresponding to the third predetermined scrolling output relation is at 6 second. When the microcontroller 11 enters the accelerating output state, the input time point is set to be at 0 second. As the time the microcontroller 11 stays in the same accelerating output state increases, the input time point increases synchronously. In the present embodiment, the input time point increases by 0.05 seconds; however, the present disclosure is not limited thereto.

In the present embodiment, after step S330, the microcontroller 11 sets the end time point correspondingly and sets the input time point to be at 0 second, as shown in step S340. Next, the microcontroller 11 generates the aggregated count output according to the predetermined scrolling output relation corresponding to the acceleration level and the input time point. For instance, when the acceleration level is 1, the corresponding predetermined scrolling output relation is the first predetermined scrolling output relation. In the present embodiment, each of the predetermined scrolling output relations is realized as a cubic polynomial function. Therefore, the microcontroller 11 calculates the cubic function, as shown in step S350. Afterwards, the microcontroller 11 outputs the scrolling count value according to the aggregated count output generated from step S350 via the output interface 15, as shown in step S360. In practice, the scrolling count value is outputted in integer format. Therefore, the rounding method can be adopted when performing step S350, i.e. when calculating the cubic function so as to generate integers, which has been described above and will not be further described herein.

Next, the microcontroller 11 increases the input time point by 0.05 seconds, as shown in step S370. The microcontroller 11 determines whether the input time point is greater than the end time point, as shown in step S380. If the determination result of step S380 is positive, it means the microcontroller 11 has finished outputting according to the corresponding predetermined scrolling output relation. Therefore, the microcontroller 11 sets the value of the accelerating flag to be false, as shown in step S390. The method then returns to step S300, waiting for the next scrolling operation performed on the scroll wheel 142 by the user.

If the determination result of step S380 is negative, it means the microcontroller 11 is still operating in the corresponding accelerating output state. Afterwards, the microcontroller 11 determines whether a scrolling operation exists via the scrolling input receiving device 14, as shown in step S400. Fig the determination result of step S400 is negative, it means there is no trigger operation that triggers the accelerating output state to level up, nor is there a trigger operation that stops the accelerating output state. The method then returns to step S350 to perform the next cubic function calculation. If the determination result of step S400 is positive, the method goes back to step S310 to determines if the trigger condition is satisfied.

Please refer to step S320. If the determination result of step S320 is positive, i.e. the value of the accelerating flag is true, it means the microcontroller 11 is already in the accelerating output state when the trigger condition is satisfied. Next, the microcontroller 11 determines if the acceleration level reaches the maximum value, as shown in step S410. For example, the microcontroller 11 retrieves the acceleration level to determine if the acceleration level reaches the maximum value. In the present embodiment, the third accelerating output state is the accelerating output state of the highest level, whose acceleration level is 3; however, the present disclosure is not limited thereto. If the determination result of step S410 is positive, it means the microcontroller 11 is operating in the third accelerating output state, i.e. the acceleration level is 3 according to the present embodiment. Accordingly, the microcontroller 11 remains the same acceleration level, sets the end time point correspondingly, e.g. sets the end time point to be at 6 second in accordance with the third accelerating output state, and sets the input time point to be at 0 second, i.e. reenters the third accelerating output state, as shown in step S420. Furthermore, since entering the highest accelerating output state does not change the acceleration level and the end time point, in practice, the aforementioned steps of remaining the acceleration value and setting the end time point can be realized by not accessing the acceleration level and the end time point. Therefore, step S420 can be performed by setting the input time point to be at 0 second only. If the determination result of step S410 is negative, it means the accelerating output state of microcontroller 11 can be enhanced. Accordingly, the microcontroller 11 increases the acceleration level by 1, sets the end time point correspondingly, e.g. sets the end time point to be at 4 second corresponding to the second accelerating output state, or sets the end time point to be at 6 second corresponding to the third accelerating output state, and sets the input time point to be 0 second, as shown in step S430. After step S420 and step S430 are performed, step S350 follows.

Please refer to step S310. If the determination result of step S310 is negative, i.e. in the present embodiment, the aggregated count value does not exceed the predetermined value, the microcontroller 11 sets the value of the accelerating flag to be false, as shown in step S440. Next, the microcontroller 11 outputs the scrolling count value according to the actual scrolling amount without enabling any acceleration effects, as shown in step S450. In practice, the scrolling count value outputted by the microcontroller 11 can be the same as the scrolling count or in a certain proportion thereto. However, the present disclosure is not limited thereto. Afterwards, the method returns to step S300. In addition, in the present embodiment, method of accelerating scrolling input is realized by one process. In practice, the method of accelerating scrolling input can be realized by two independent processes as well, wherein in one of the processes, the microcontroller 11 outputs the scrolling count value according to the operation state, and in the other process, the microcontroller 11 determines whether the trigger condition is satisfied, according to which the microcontroller 11 sets the operation state.

The descriptions illustrated supra set forth simply the embodiments of the instant disclosure, and the characteristics of the present disclosure are by no means restricted thereto. All changes, alterations, or modifications conveniently considered by those skilled in the art are deemed to be encompassed within the scope of the instant disclosure delineated by the following claims.

What is claimed is:

1. A method of accelerating scrolling input applicable to a mouse, the mouse including a scrolling input receiving device and having an initial output state, a first accelerating output state, and a second accelerating output state, in which the first accelerating output state corresponds to a first predetermined scrolling output relation with a first cubic function between a first time input and a first aggregated count output, and the second accelerating output state corresponds to a second predetermined scrolling output relation with a second cubic function between a second time input and a second aggregated count output, the method of accelerating scrolling input comprising:
   (a) the mouse detecting a scrolling operation performed on the scrolling input receiving device using the scrolling input receiving device;
   (b) the mouse generating an aggregated count value using the scrolling input receiving device by aggregating the scrolling count of the scrolling operation during a preset time interval, and
   (c) in response to a determination that the aggregated count value is greater than a predetermined value, performing the following steps:
   in response to the mouse operating in the initial output state, the mouse switches to the first accelerating output state and outputs a first scrolling count value according to the first predetermined scrolling output relation, wherein the first time input is a duration of time since the mouse switches to the first accelerating output state, and the first scrolling count value is outputted based on the first aggregated count output at a corresponding first time input;

in response to the mouse operating in the first accelerating output state, the mouse switches to the second accelerating output state and outputs a second scrolling count value according to the second predetermined scrolling output relation, wherein the second time input is a duration of time since the mouse switches to the second accelerating output state, and the second scrolling count value is outputted based on the second aggregated count output at a corresponding second time input.

2. The method of claim 1, wherein step (c) further includes:

in response to the mouse operating in the second accelerating output state, the mouse stays in the second accelerating output state and outputs a scrolling count value according to the second predetermined scrolling output relation.

3. The method of claim 1, wherein the mouse has a third accelerating output state, the third accelerating output state corresponding to a third predetermined scrolling output relation between time input and aggregated count output, in which step (c) further includes:

in response to the mouse operating in the second accelerating output state, the mouse switches to the third accelerating output state and outputs a scrolling count value according to the third predetermined scrolling output relation.

4. The method of claim 3, wherein step (c) further includes:

in response to the mouse operating in the third accelerating output state, the mouse stays in the third accelerating output state and outputs a scrolling count value according to the third predetermined scrolling output relation.

5. The method of claim 1, wherein the mouse has at least one further accelerating output state of progressively higher accelerating rates, each corresponding to a predetermined scrolling output relation between time input and aggregated count output, wherein step (c) further includes:

in response to the mouse operating in the second accelerating output state, the mouse switches to the first one of the at least one further accelerating output states and outputs a scrolling count value according to the predetermined scrolling output relation corresponding to the first further accelerating output state.

6. The method of claim 5, wherein step (c) further includes:

in response to the mouse operating in one of the further accelerating output states but not in the last one thereof, the mouse switches to the next further accelerating output state and outputs a scrolling count value according to the predetermined scrolling output relation corresponding to said next further accelerating output relation; and in response to the mouse operating in the last one of the at least one further accelerating output states, the mouse stays in the last further accelerating output state and outputs a scrolling count value according to the predetermined scrolling output relation corresponding to the last further accelerating output state.

7. The method of claim 1, further including:

in response to the mouse determining that the aggregated count value does not exceed the predetermined value and the mouse operates in the first accelerating output state or the second accelerating output state, the mouse switches to the initial output state.

8. The method of claim 1, wherein the first aggregated count output with respect to the first time input of the first predetermined scrolling output relation defines a first initial output rate, and the second aggregated count output with respect to the second time input of the second predetermined scrolling output relation defines a second initial output rate, in which the second initial output rate is greater than the first initial output rate.

9. The method of claim 1, wherein the rate of change of the first aggregated count output with respect to the first time input of the first predetermined scrolling output relation over a duration of time since the mouse switches to the first accelerating output state decreases progressively.

10. A mouse, comprising:

a scrolling input receiving device;

an output interface; and a microcontroller electrically connected to the scrolling input receiving device and the output interface respectively, the microcontroller having an initial output state, a first accelerating output state, and a second accelerating output state, in which a first predetermined scrolling output relation with a first cubic function between a first time input and a first aggregated count output corresponding to the first accelerating output state and a second predetermined scrolling output relation with a second cubic function between a second time input and a second aggregated count output corresponding to the second accelerating output state are stored in the microcontroller, wherein the microcontroller detects a scrolling operation performed on the scrolling input receiving device using the scrolling input receiving device and generates an aggregated count value using the scrolling input receiving device by aggregating the scrolling count of the scrolling operation during a preset time interval; when the microcontroller determines that the aggregated count value is greater than a predetermined value and the microcontroller operates in the initial output state, the microcontroller switches to the first accelerating output state and outputs a first scrolling count value according to the first predetermined scrolling output relation via the output interface; when the microcontroller determines that the aggregated count value is greater than the predetermined value and the microcontroller operates in the first accelerating output state, the microcontroller switches to the second accelerating output state and outputs a second scrolling count value according to the second predetermined scrolling output relation via the output interface, wherein the first time input is a duration of time since the mouse switches to the first accelerating output state, and the first scrolling count value is outputted based on the first aggregated count output at a corresponding first time input, wherein the second time input is a duration of time since the mouse switches to the second accelerating output state, and the second scrolling count value is outputted based on the second aggregated count output at a corresponding second time input.

11. The mouse of claim 10, wherein when the microcontroller determines that the aggregated count value is greater than the predetermined value and the microcontroller operates in the second accelerating output state, the microcontroller stays in the second accelerating output state and outputs a scrolling count value according to the second predetermined scrolling output relation via the output interface.

12. The mouse of claim 10, wherein the microcontroller has a third accelerating output state and stores a third predetermined scrolling output relation between time input and aggregated count output corresponding to the third accelerating output state, and when the microcontroller determines that the aggregated count value is greater than the predetermined value and the microcontroller operates in the second accelerating output state, the microcontroller switches to the third accelerating output states and outputs a scrolling count value according to the third predetermined scrolling output relation via the output interface.

13. The mouse of claim 12, wherein when the microcontroller determines that the aggregated count value is greater than the predetermined value and the microcontroller operates in the third accelerating output state, the microcontroller stays in the third accelerating output state and outputs a scrolling count value according to the third predetermined scrolling output relation.

14. The mouse of claim 10, wherein the microcontroller has at least one further accelerating output state of progressively higher accelerating rates, each corresponding to a predetermined scrolling output relation between time input and aggregated count output stored in the microcontroller, and when the microcontroller determines that the aggregated count value is greater than the predetermined value and the microcontroller operates in the second accelerating output state, the microcontroller switches to the first one of the at least one further accelerating output states and outputs a scrolling count value according to the predetermined scrolling output relation corresponding to the first further accelerating output state via the output interface.

15. The mouse of claim 14, wherein when the microcontroller determines that the aggregated count value is greater than the predetermined value and the microcontroller operates in one of the further accelerating output states but not in the last one thereof, the microcontroller switches to the next further accelerating output state and outputs a scrolling count value according to the predetermined scrolling output relation corresponding to said next further accelerating output relation via the output interface, and when the microcontroller determines that the aggregated count value is greater than the predetermined value and the microcontroller operates in the last one of the further accelerating output states, the microcontroller stays in the last further accelerating output state and outputs a scrolling count value according to the predetermined scrolling output relation corresponding to the last further accelerating output state via the output interface.

16. The mouse of claim 10, wherein when the microcontroller determines that the aggregated count value does not exceed the predetermined value and the microcontroller operates in the first accelerating output state or the second accelerating output state, the microcontroller switches to the initial output state.

17. The mouse of claim 10, wherein the first aggregated count output with respect to the first time input of the first predetermined scrolling output relation defines a first initial output rate, and the second aggregated count output with respect to the second time input of the second predetermined scrolling output relation defines a second initial output rate, in which the second initial output rate is greater than the first initial output rate.

18. The mouse of claim 10, wherein the rate of change of the first aggregated count output with respect to the first time input over a duration of time since the mouse switches to the first accelerating output state decreases progressively.

19. A method of accelerating scrolling input applicable to a mouse, the mouse including a scrolling input receiving device and having an initial output state, a first accelerating output state, and a second accelerating output state, in which when the mouse operates in the initial output state, the mouse outputs a scrolling count value in direct proportion with the scrolling amount received by the scrolling input receiving device; when the mouse operates in the first accelerating output state, the mouse outputs a first scrolling count value according to the first predetermined scrolling output relation with a first cubic function between a first time input and a first aggregated count output; when the mouse operates in the second accelerating output state, the mouse outputs a second scrolling count value according to the second predetermined scrolling output relation with a second cubic function between a second time input and a second aggregated count output, the method of accelerating rolling output including the following steps:
  (a) determining whether a first scrolling operation received by the scrolling input receiving device satisfies a trigger condition;
  (b) when it is determined that the first scrolling operation does not satisfy the trigger condition, the mouse stays in the initial output state; and
  (c) in response to the first scrolling operation satisfying the trigger condition, performing the following steps:
    (c1) in response to determining that the mouse is operating in the initial output state before the first scrolling operation is performed, the mouse enters the first accelerating output state and stays therein for a first predetermined time interval;
    (c2) in response to the mouse detecting a second scrolling operation satisfying the trigger condition before the first predetermined time interval ends, the mouse enters the second accelerating output state and stays therein for a second predetermined time interval; and
    (c3) in response to the mouse not detecting the second scrolling operation satisfying the trigger condition before the first predetermined time interval ends, the mouse resumes the initial output state when the first predetermined time interval ends,
  wherein the first time input is a duration of time since the mouse switches to the first accelerating output state, and the first scrolling count value is outputted based on the first aggregated count output at a corresponding first time input,
  wherein the second time input is a duration of time since the mouse switches to the second accelerating output state, and the second scrolling count value is outputted based on the second aggregated count output at a corresponding second time input.

20. The method of claim 19, wherein step (c) further includes:
  (c4) in response to the mouse detecting a third scrolling operation satisfying the trigger condition before the second predetermined time interval ends, the mouse re-enters the second accelerating output state and stays therein for the second predetermined time interval; and (c5) in response to the mouse not detecting the third scrolling operation satisfying the trigger condition before the second predetermined time interval ends, the mouse resumes the initial output state when the second predetermined time interval ends.

21. A method of accelerating scrolling input applicable to a mouse, the mouse including a scrolling input receiving device and having an initial output state, a first accelerating output state, and a second accelerating output state, in which the first accelerating output state corresponds to a first predetermined scrolling output relation, and the second accelerating output state corresponds to a second predetermined scrolling output relation, the method of accelerating scrolling input comprising:

(a) the mouse detecting a scrolling operation performed on the scrolling input receiving device using the scrolling input receiving device;

(b) the mouse generating an aggregated count value using the scrolling input receiving device by aggregating the scrolling count of the scrolling operation during a preset time interval, and (c) in response to a determination that the aggregated count value is greater than a predetermined value, performing the following steps:

in response to the mouse operating in the initial output state, the mouse switches to the first accelerating output state and outputs a first scrolling count value according to the first predetermined scrolling output relation, wherein the first predetermined scrolling output relation corresponds to a first cubic functional curve of a first aggregated count output associated with a first predetermined time interval, the first scrolling count value is outputted based on the first aggregated count output at a corresponding time point of the first predetermined time interval;

in response to the mouse operating in the first accelerating output state, the mouse switches to the second accelerating output state and outputs a second scrolling count value according to the second predetermined scrolling output relation, wherein the second predetermined scrolling output relation corresponds to a second cubic functional curve of a second aggregated count output associated with a second predetermined time interval, the second scrolling count value is outputted based on the second aggregated count output at a corresponding time point of the second predetermined time interval.

\* \* \* \* \*